United States Patent
Tamaoki et al.

(10) Patent No.: US 9,833,712 B2
(45) Date of Patent: Dec. 5, 2017

(54) GAME SYSTEM, SERVER SYSTEM, PROCESSING METHOD, AND INFORMATION STORAGE MEDIUM

(71) Applicant: BANDAI NAMCO ENTERTAINMENT INC., Tokyo (JP)

(72) Inventors: Jun Tamaoki, Toyko (JP); Makoto Yonezawa, Yokohama (JP); Masayoshi Noda, Tokyo (JP); Tsuyoshi Takahashi, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 276 days.

(21) Appl. No.: 14/484,367

(22) Filed: Sep. 12, 2014

(65) Prior Publication Data

US 2015/0080127 A1 Mar. 19, 2015

(30) Foreign Application Priority Data

Sep. 18, 2013 (JP) ................................ 2013-193591

(51) Int. Cl.
*A63F 9/24* (2006.01)
*A63F 13/803* (2014.01)
(Continued)

(52) U.S. Cl.
CPC ............ *A63F 13/803* (2014.09); *A63F 13/57* (2014.09); *A63F 13/847* (2014.09)

(58) Field of Classification Search
CPC . A63F 2300/807; A63F 13/825; A63F 13/803
See application file for complete search history.

(56) References Cited

U.S. PATENT DOCUMENTS

| | | | | |
|---|---|---|---|---|
| 6,807,521 | B1 * | 10/2004 | Kurosawa | ............... A63F 13/10 463/7 |
| 2004/0157662 | A1 * | 8/2004 | Tsuchiya | ................. A63F 13/10 463/32 |
| 2006/0287027 | A1 * | 12/2006 | Hardisty | ................. A63F 13/10 463/8 |

FOREIGN PATENT DOCUMENTS

| | | |
|---|---|---|
| JP | A-2001-194447 | 7/2001 |
| JP | A-2004-113355 | 4/2004 |

(Continued)

OTHER PUBLICATIONS

"Caladrius." http://www.famitsu.com/news/201303/21030607.html. Obtained Aug. 19, 2015, publication date: Mar. 21, 2013.
(Continued)

*Primary Examiner* — Steve Rowland
(74) *Attorney, Agent, or Firm* — Oliff PLC

(57) ABSTRACT

A game system includes a game processing section that performs a process that implements a game, a data link processing section that determines that a data link activation condition has been satisfied when a data link start positional relationship has been established between a moving object and another moving object, and performs a process that produces a data link effect that changes at least one of the radar-related capability of the moving object and the performance of the moving object, and a display processing section that performs a display process that displays a display object that notifies a player of information about a data link. The data link processing section performs a process that prohibits production of the data link effect during at least one of a given first period after the game has started, and a given second period after production of the data link effect has been canceled.

18 Claims, 17 Drawing Sheets

(51) Int. Cl.
*A63F 13/847* (2014.01)
*A63F 13/57* (2014.01)

(56) References Cited

FOREIGN PATENT DOCUMENTS

JP 2006-280524 A 10/2006
JP A-2007-279308 10/2007

OTHER PUBLICATIONS

"Moe Moe Daisensou." http://www.4gamer.net/games/166/G016680/20120704052/. Obtained Aug. 19, 2015, publication date: Jul. 4, 2012.
Shin Hikari Shinwa Parutena no Kagami, Weekly Famitsu, Enterbrain Inc., Feb. 2, 2012, pp. 48-55, vol. 27, No. 7.

* cited by examiner

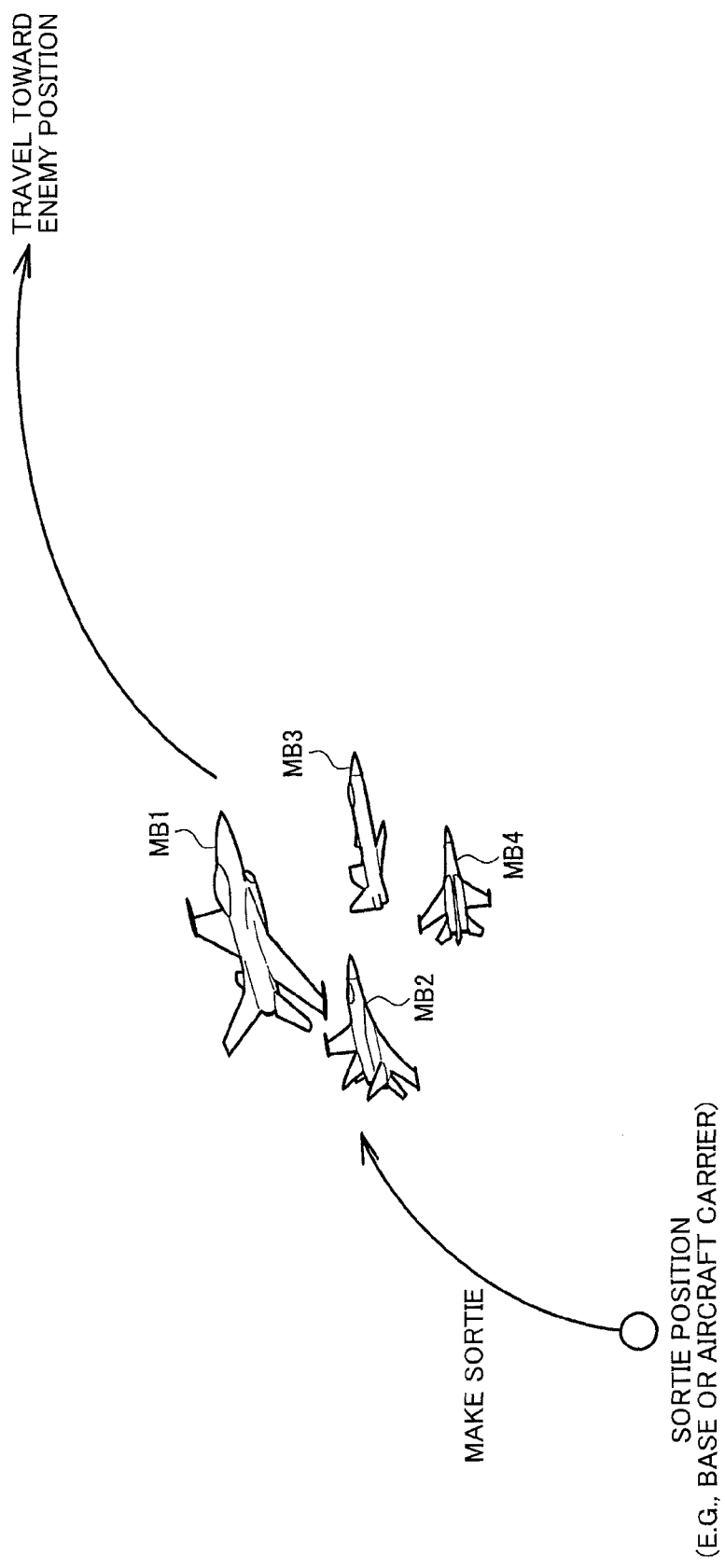

DATA LINK START
POSITIONAL RELATIONSHIP

DATA LINK DISCONNECTION
POSITIONAL RELATIONSHIP

FIG. 7A

| PARAMETER NAME | UNIT | DETAILS |
|---|---|---|
| START DISTANCE LS | METERS (m) | DATA LINK ACTIVATION DISTANCE |
| DISCONNECTION DISTANCE LE | METERS (m) | DATA LINK CONTINUATION LIMIT DISTANCE |
| DISCONNECTION DETERMINATION TIME TE | TIME (s) | TIME UNTIL DATA LINK IS DISCONNECTED AFTER PLAYER FIGHTER AIRCRAFT AND FRIEND FIGHTER AIRCRAFT HAVE BEEN SITUATED OUTSIDE DIS- CONNECTION DISTANCE RANGE |

FIG. 7B

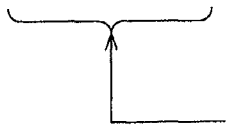

LS, LE, TE

SET BASED ON STATUS INFORMATION, GAME STATUS INFORMATION, INPUT INFORMATION, OR CHARGE INFORMATION ABOUT PLAYER OR THE OTHER PLAYER

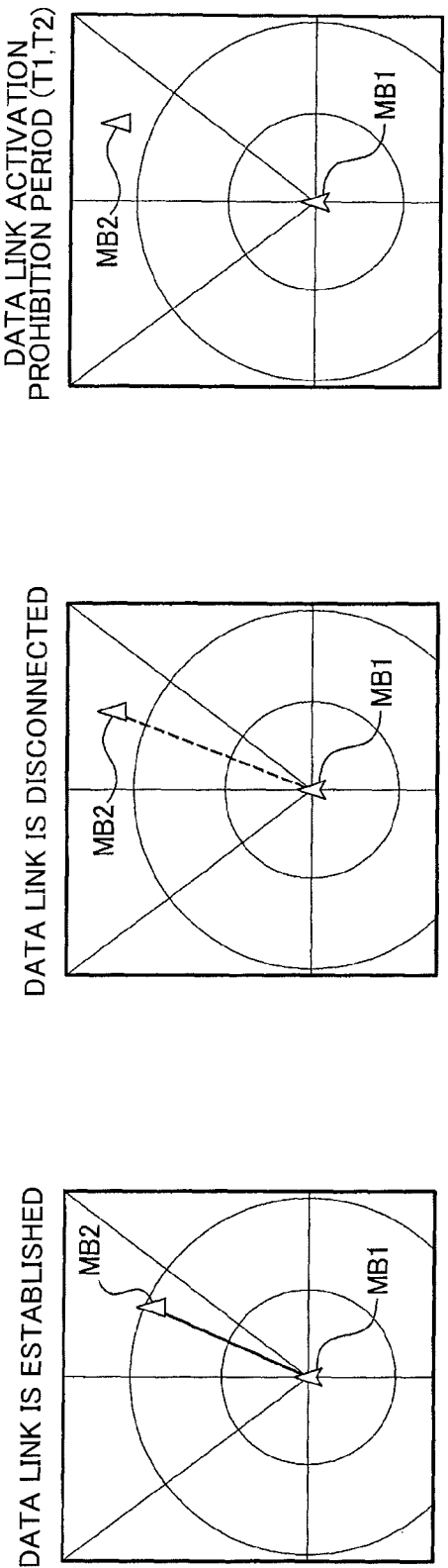

FIG. 11A
DATA LINK IS ACTIVE!!
PLAYER TANAKA
FIG. 11B
DATA LINK STANDBY!!
(ACTIVATION IS PROHIBITED,
STANDBY PERIOD)
FIG. 11C
DATA LINK CAN BE ESTABLISHED
OBM
TANAKA
3591m
FIG. 11D
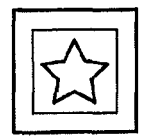 BASIC SET
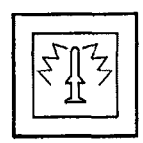 CRITICAL
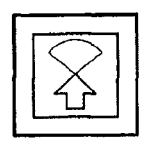 LONG-RANGE
⋮

FIG. 12

| No. | EFFECT NAME | FUNCTION | ACQUIRED RANK |
|---|---|---|---|
| 1 | BASIC SET | • INCREASE GUIDANCE PERFORMANCE<br>• INCREASE BLAZE PERFORMANCE<br>• INCREASE LOCK-ON SPEED | RK1 |
| 2 | CRITICAL | INCREASE POWER | RK2 |
| 3 | LONG-RANGE | • INCREASE LOCK-ON DISTANCE<br>• INCREASE LOCK-ON RANGE | RK3 |
| 4 | HIGH HOMING+ | INCREASE GUIDANCE PERFORMANCE (+) | RK4 |
| 5 | QUICK TURN | INCREASE HIGH G DURATION | RK5 |
| 6 | ANTI-STALL | INCREASE ANTI-STALL PERFORMANCE | RK6 |
| 7 | QUICK RELOAD+ | INCREASE BLAZE PERFORMANCE (+) | RK7 |
| 8 | QUICK LOCK-ON+ | INCREASE LOCK-ON SPEED (+) | RK8 |

FIG. 14A
LEVEL OF PLAYER IS HIGH
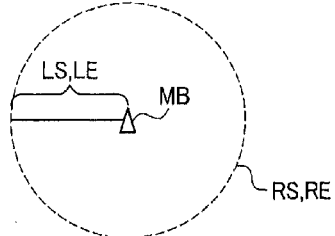
LOW DATA LINK EFFECT
LEVEL OF PLAYER IS LOW
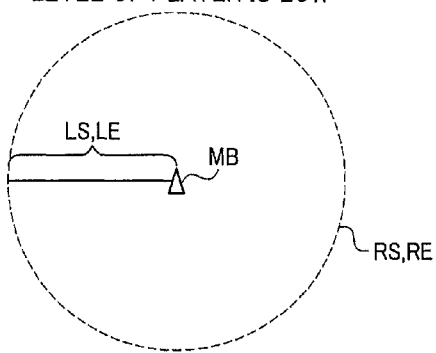
HIGH DATA LINK EFFECT
FIG. 14B
PLAY COUNT (PLAY TIME) IS SMALL
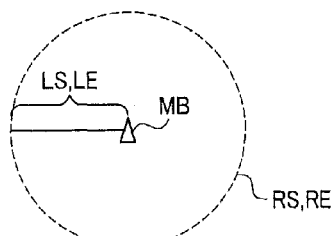
LOW DATA LINK EFFECT
PLAY COUNT (PLAY TIME) IS LARGE
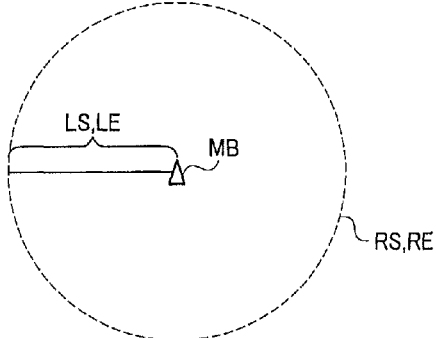
HIGH DATA LINK EFFECT
FIG. 14C
AMOUNT CHARGED TO PLAYER IS SMALL
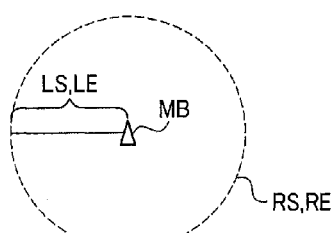
LOW DATA LINK EFFECT
AMOUNT CHARGED TO PLAYER IS LARGE
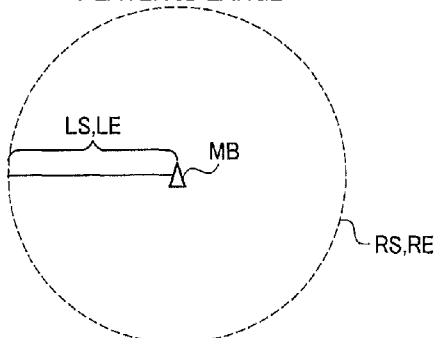
HIGH DATA LINK EFFECT

GAME SYSTEM, SERVER SYSTEM, PROCESSING METHOD, AND INFORMATION STORAGE MEDIUM Japanese Patent Application No. 2013-193591 filed on Sep. 18, 2013, is hereby incorporated by reference in its entirety.

BACKGROUND

The present invention relates to a game system, a server system, an information storage medium, and the like.

In recent years, a game system has attracted attention that communicably connects a server system and a terminal device through a network, and allows the player to enjoy a game that utilizes a network (hereinafter referred to as "network game").

Such a network game may be provided with a game mode in which a plurality of players form a team, and attack an enemy in cooperation to clear a mission. For example, a fighter aircraft game may be designed so that fighter aircraft operated by the player and fighter aircraft operated by a friend player form a team, and attack an enemy position in cooperation to clear a mission.

In such a game mode, it is important to create a sense of unity that allows the player to feel that he is cooperating with the friend player to clear a mission in order to provide an interesting game, and improve the sense of virtual reality.

A tactical system referred to as "data link" has been employed for fighter aircraft and the like in the real world. The data link is designed so that information used for an operation is transmitted and shared between a plurality of fighter aircraft to improve the radar performance and the like so that the operation proceeds advantageously, for example. JP-A-2007-279308 and JP-A-2001-194447 disclose a related-art technique relating to the data link in the real world. JP-A-2004-113355 discloses a related-art technique relating to a game system that displays a radar screen.

However, if the data link process employed in the real world is applied directly to a game system, the player may feel inconsistency during the game, or the game may not progress smoothly, for example.

SUMMARY

According to one aspect of the invention, there is provided a game system comprising:

a game processing section that performs a process that implements a game that utilizes a moving object that moves in a game space;

a data link processing section that determines that a data link activation condition has been satisfied when a data link start positional relationship has been established between the moving object and another moving object, and performs a process that produces a data link effect, the process that produces the data link effect being a process that changes at least one of a radar-related capability of the moving object and performance of the moving object; and a display processing section that performs a display process that displays a display object that notifies a player of information about a data link, the data link processing section performing a process that prohibits production of the data link effect during at least one of a given first period after the game has started, and a given second period after production of the data link effect has been canceled.

According to another aspect of the invention, there is provided a game system comprising:

a game processing section that performs a process that implements a game that utilizes a moving object that moves in a game space;

a data link processing section that determines that a data link activation condition has been satisfied when a data link start positional relationship has been established between the moving object and another moving object, and performs a process that produces a data link effect, the process that produces the data link effect being a process that changes at least one of a radar-related capability of the moving object and performance of the moving object; and a display processing section that performs a display process that displays a display object that notifies a player of information about a data link, the data link processing section setting at least one of the data link activation condition and the data link effect based on at least one piece of information among status information, game status information, input information, and charge information about a player who operates the moving object or another player who operates the other moving object.

According to another aspect of the invention, there is provided a server system comprising:

a game processing section that performs a process that implements a game that utilizes a moving object that moves in a game space;

a data link processing section that determines that a data link activation condition has been satisfied when a data link start positional relationship has been established between the moving object and another moving object, and performs a process that produces a data link effect, the process that produces the data link effect being a process that changes at least one of a radar-related capability of the moving object and performance of the moving object; and a display processing section that performs a display process that displays a display object that notifies a player of information about a data link, the data link processing section performing a process that prohibits production of the data link effect during at least one of a given first period after the game has started, and a given second period after production of the data link effect has been canceled.

According to another aspect of the invention, there is provided a processing method for a game system comprising:

performing a process that implements a game that utilizes a moving object that moves in a game space;

performing a data link process that determines that a data link activation condition has been satisfied when a data link start positional relationship has been established between the moving object and another moving object, and changes at least one of a radar-related capability of the moving object and performance of the moving object; and performing a display process that displays a display object that notifies a player of information about a data link, the performing of the data link process including performing a process that prohibits production of the data link effect during at least one of a given first period after the game has started, and a given second period after production of the data link effect has been canceled.

According to another aspect of the invention, there is provided a computer-readable information storage medium storing a program that causes a computer to execute the above processing method.

BRIEF DESCRIPTION OF THE DRAWINGS

FIG. 5 is a view illustrating a sortie from a sortie position.

FIGS. 7A and 7B are views illustrating a method that sets a data link activation condition based on status information or the like about a player.

FIGS. 10A to 10C are views illustrating a method that implements a data link display process.

FIGS. 11A to 11D are views illustrating a method that implements a data link display process.

FIG. 12 is a view illustrating an example of a data link effect table.

FIGS. 14A to 14C are views illustrating a method that sets a data link activation condition and a data link effect based on status information or the like about a player.

DESCRIPTION OF EXEMPLARY EMBODIMENTS

Figure 1:
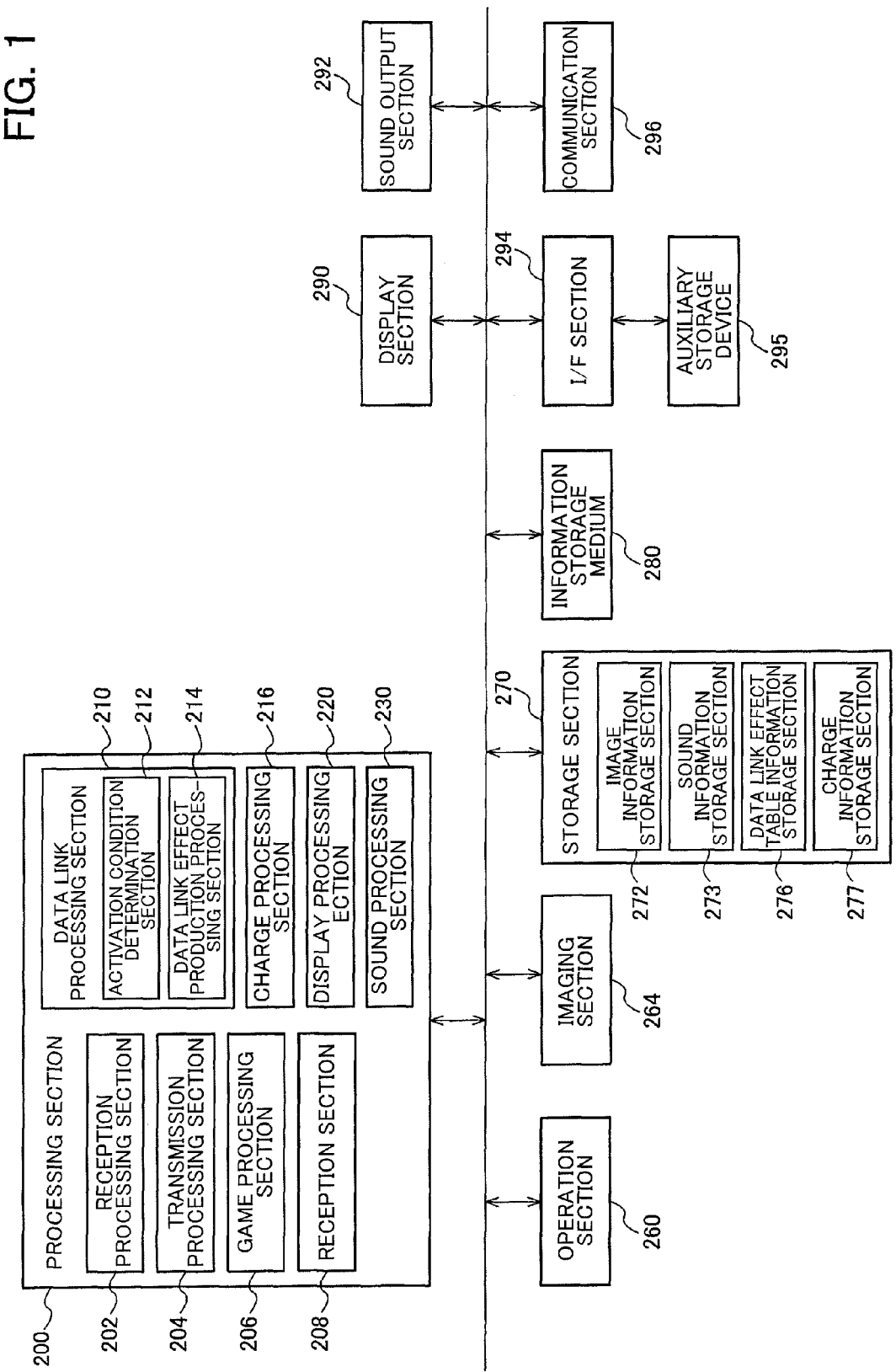
FIG. 1 illustrates a configuration example of a game system according to one embodiment of the invention.

Several aspects of the invention may provide a game system, a server system, a processing method, an information storage medium, and the like that that make it possible to implement an appropriate and natural data link process during the game.

According to one embodiment of the invention, there is provided a game system comprising:

a game processing section that performs a process that implements a game that utilizes a moving object that moves in a game space;

a data link processing section that determines that a data link activation condition has been satisfied when a data link start positional relationship has been established between the moving object and another moving object, and performs a process that produces a data link effect, the process that produces the data link effect being a process that changes at least one of a radar-related capability of the moving object and performance of the moving object; and a display processing section that performs a display process that displays a display object that notifies a player of information about a data link, the data link processing section performing a process that prohibits production of the data link effect during at least one of a given first period after the game has started, and a given second period after production of the data link effect has been canceled.

According to one embodiment of the invention, it is determined that the data link activation condition has been satisfied when the data link start positional relationship has been established between the moving object and the other moving object, and the process that produces the data link effect (data link effect production process) is performed. Specifically, the process that changes at least one of the radar-related capability of the moving object and the performance of the moving object is performed. In this case, production of the data link effect is prohibited during at least one of the first period after the game has started, and the second period after production of the data link effect has been canceled. This makes it possible to prevent a situation in which the data link effect is produced immediately after the game has started, or the data link effect is produced immediately after production of the data link effect has been canceled. Therefore, an appropriate and natural data link process can be implemented during the game.

In the game system, the data link processing section may change a data link start positional relationship determination parameter based on at least one piece of information among status information, game status information, input information, and charge information about a player who operates the moving object or another player who operates the other moving object.

This makes it possible to set the data link activation condition in various ways based on the status information or the like about the player or the other player, for example.

In the game system, the data link processing section may perform a process that cancels production of the data link effect when a data link disconnection positional relationship has been established between the moving object and the other moving object, and a state in which the data link disconnection positional relationship is established has continued for a given disconnection determination time.

This makes it possible to prevent a situation in which production of the data link effect is canceled immediately after the data link disconnection positional relationship has been established between the moving object and the other moving object, for example.

In the game system, the data link processing section may set at least one of a data link disconnection positional relationship determination parameter and the disconnection determination time based on at least one piece of information among status information, game status information, input information, and charge information about a player who operates the moving object or another player who operates the other moving object.

This makes it possible to set the data link disconnection condition in various ways based on the status information or the like about the player or the other player.

In the game system, the game processing section may perform a process that causes the moving object and the other moving object to depart from an identical position when the game has started.

This makes it possible to prevent a situation in which the data link effect is produced during the first period in which the moving object and the other moving object are situated at an identical position, and the data link activation condition is satisfied.

In the game system, the display processing section may perform at least one of a display process that notifies the player whether or not the data link is established between the moving object and the other moving object, a display process that notifies the player of a data link status, and a display process that notifies the player of details of the data link effect.

This makes it possible to allow the player to visually recognize whether or not the data link is established between the moving object and the other moving object, the data link status, or the details of the data link effect.

In the game system, the display processing section may perform a display process that connects the moving object and the other moving object using a first line when the data link is established between the moving object and the other moving object, and may perform a display process that connects the moving object and the other moving object using a second line that differs in pattern from the first line when the data link is not established between the moving object and the other moving object.

This makes it possible to allow the player to visually recognize whether or not the data link is established by utilizing the display pattern of the first line and the display pattern of the second line.

In the game system, the display processing section may perform a display process that causes a display state when the data link is established between the moving object and the other moving object to differ from a display state when production of the data link effect is prohibited during the first period or the second period.

This makes it possible to allow the player to visually recognize that production of the data link effect is prohibited due to the first period or the second period.

In the game system, the data link processing section may perform at least one of a process that changes radar performance, a process that changes lock-on performance, and a process that changes a capability of a weapon that utilizes radar, as the process that changes the radar-related capability of the moving object.

The data link processing section may perform a process that changes the performance of the moving object as the process that produces the data link effect.

In the game system, the data link processing section may set at least one of the data link activation condition and the data link effect based on at least one piece of information among status information, game status information, input information, and charge information about a player who operates the moving object or another player who operates the other moving object.

This makes it possible to reflect the status information, the game status information, the input information, or the charge information about the player or the other player in the data link activation condition and the data link effect.

According to another embodiment of the invention, there is provided a game system (server system) comprising:

a game processing section that performs a process that implements a game that utilizes a moving object that moves in a game space;

a data link processing section that determines that a data link activation condition has been satisfied when a data link start positional relationship has been established between the moving object and another moving object, and performs a process that produces a data link effect, the process that produces the data link effect being a process that changes at least one of a radar-related capability of the moving object and performance of the moving object; and a display processing section that performs a display process that displays a display object that notifies a player of information about a data link, the data link processing section setting at least one of the data link activation condition and the data link effect based on at least one piece of information among status information, game status information, input information, and charge information about a player who operates the moving object or another player who operates the other moving object.

According to another embodiment of the invention, there is provided a server system comprising:

a game processing section that performs a process that implements a game that utilizes a moving object that moves in a game space;

a data link processing section that determines that a data link activation condition has been satisfied when a data link start positional relationship has been established between the moving object and another moving object, and performs a process that produces a data link effect, the process that produces the data link effect being a process that changes at least one of a radar-related capability of the moving object and performance of the moving object; and a display processing section that performs a display process that displays a display object that notifies a player of information about a data link, the data link processing section performing a process that prohibits production of the data link effect during at least one of a given first period after the game has started, and a given second period after production of the data link effect has been canceled.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Game System

FIG. 1 illustrates a configuration example of a game system according to one embodiment of the invention. The game system includes a processing section 200, an operation section 260, an imaging section 264, a storage section 270, a display section 290, a sound output section 292, an I/F section 294, and a communication section 296. Note that the configuration of the game system according to one embodiment of the invention is not limited to the configuration illustrated in FIG. 1. Various modifications may be made, such as omitting some of the elements (sections), or adding other elements.

The processing section 200 (processor) performs a game process, an image display process, a sound process, and the like based on operation information from the operation section 260, a program, and the like. The processing section 200 performs various processes using the storage section 270 as a work area. The function of the processing section 200 may be implemented by hardware such as a processor (e.g., CPU or GPU) or an ASIC (e.g., gate array), or a program.

The processing section 200 includes a reception processing section 202, a transmission processing section 204, a game processing section 206, a reception section 208, a data link processing section 210, a charge processing section 216, a display processing section 220, and a sound processing section 230.

The reception processing section 202 performs a reception process that receives information through a network, and the transmission processing section 204 performs a transmission process that transmits information through a network. For example, the reception processing section 202 performs the reception process that receives information from an external device (e.g., server system or another terminal device), and the transmission processing section 204 performs a transmission process that transmits information to an external device (e.g., server system or another terminal device). The reception process includes a process that instructs the communication section 296 to receive information, a process that acquires information received by the communication section 296, and writes the acquired information into the storage section 270, and the like. The transmission process includes a process that instructs the communication section 296 to transmit information, a process that indicates the transmission target information to the communication section 296, and the like. The display processing section 220 performs a process for displaying an image on the display section 290. For example, when the terminal device generates an image, the display processing section 220 performs a drawing process based on the results of various processes (game process) performed by the processing section 200 to generate an image, and outputs the generated image to the display section 290. When the server system generates an image, the display processing section 220 performs a process that displays an image based on image information from the server system on the display section 290. The sound processing section 230 performs a sound process based on the results of various processes performed by the processing section 200. The sound processing section 230 thus causes the sound output section 292 to output a background music (BGM), a game sound, voice, and the like. The image information displayed on the display section 290 and the sound information output from the sound output section 292 are stored in an image information storage section 272 and a sound information storage section 273 included in the storage section 270. The details of the game processing section 206, the reception section 208, the data link processing section 210, and the charge processing section 216 are described later.

The operation section 260 allows the player (user) to input various types of information (e.g., operation information). The function of the operation section 260 may be implemented by an operation button, a direction key, an analog stick, a lever, a sensor (e.g., angular speed sensor and acceleration sensor), a microphone, a touch panel display, and the like.

The imaging section 264 (camera) captures an object. The imaging section 264 may be implemented by an image sensor (e.g., CCD or CMOS sensor), an optical system (e.g., focus lens), and the like.

The storage section 270 serves as a work area for the processing section 200, the communication section 296, and the like. The function of the storage section 270 may be implemented by a RAM (DRAM or VRAM), a hard disk drive (HDD), a solid-state drive (SSD), or the like. A game program and game data necessary for executing the game program are stored in the storage section 270.

An information storage medium 280 (computer-readable medium) stores a program, data, and the like. The function of the information storage medium 280 may be implemented by an optical disk (CD or DVD), an HDD, a memory (e.g., ROM), or the like. The processing section 200 performs various processes according to one embodiment of the invention based on a program (data) stored in the information storage medium 280. Specifically, a program that causes a computer (i.e., a device that includes an operation section, a processing section, a storage section, and an output section) to function as each section according to one embodiment of the invention (i.e., a program that causes a computer to execute the process performed by each section) is stored in the information storage medium 280.

The display section 290 outputs (displays) an image generated according to one embodiment of the invention. The function of the display section 290 may be implemented by an LCD, an organic EL display, a CRT, an HMD, or the like. The sound output section 292 outputs sound generated according to one embodiment of the invention. The function of the sound output section 292 may be implemented by a speaker, a headphone, or the like.

The I/F (interface) section 294 performs an interface process that interfaces with an auxiliary storage device 295 (portable information storage medium). The function of the I/F section 294 may be implemented by an I/F processing ASIC or the like. The auxiliary storage device 295 (auxiliary memory or secondary memory) is a storage device used to supplement the capacity of the storage section 270. The auxiliary storage device 295 may be implemented by a memory card (SD memory card or multimedia card), a USB memory, or the like.

The communication section 296 communicates with an external device (e.g., server system or another terminal device) through a cable or wireless network. The function of the communication section 296 may be implemented by hardware (e.g., communication ASIC or communication processor) or communication firmware.

The game system according to one embodiment of the invention includes the game processing section 206, the reception section 208, the data link processing section 210, the charge processing section 216, and the display processing section 220 for implementing the method according to one embodiment of the invention.

The game processing section 206 performs a game process. The game process includes starting the game when game start conditions have been satisfied, proceeding with the game, calculating the game results, and determining the game when game finish conditions have been satisfied, for example.

The game processing section 206 performs a process that implements a game that utilizes a moving object that moves in a game space based on the operation information (operation information input by the player). The moving object is an object that imitates an airplane (fighter aircraft), a car, a tank, a robot, a ship, a human, or the like. For example, when implementing a three-dimensional game, the moving object (object) is disposed in an object space (i.e., game space), and the movement and the motion of the moving object are controlled based on the operation information input by the player, and a given algorithm executed by a computer.

More specifically, an object (i.e., an object formed by a primitive surface such as a polygon, a free-form surface, or a subdivision surface) that represents a display object such as a moving object (character), a map (topography), a building, a track (course) (road), a tree, or a wall is disposed in the object space. Specifically, the position and the rotation angle (synonymous with orientation or direction) of the object in a world coordinate system are determined, and the object is disposed at the determined position (X, Y, Z) and the determined rotation angle (rotation angles around X, Y, and Z axes). The moving object that moves (make a motion) in the object space is controlled. For example, the moving object is moved in the object space based on the operation information input by the player, a program (movement algorithm), various types of data (motion data), and the like. Specifically, a simulation process is performed that sequentially calculates movement information (position, rotation angle, speed, or acceleration) about the moving object every frame (e.g., every 1/60th of a second). The term "frame" refers to a time unit used when performing a movement process, a motion process, and an image generation process.

The reception section 208 performs a reception process that receives information input by the player. For example, the reception section 208 receives information input through the operation section 260. Specifically, the reception section 208 receives instruction information input by the player as input information, and the game processing section 206, the data link processing section 210, and the charge processing section 216 perform various processes based on the instruction information (input information).

The charge processing section 216 performs a charge process (e.g., charge determination process, charge data generation process, and charge data storage process). A charge information storage section 277 included in the storage section 270 stores charge information used for the charge process performed by the charge processing section 216.

In one embodiment of the invention, the data link processing section 210 determines whether or not a data link activation condition whereby a data link is established between a moving object and another moving object has been satisfied.

For example, the data link processing section 210 determines that the data link activation condition has been satisfied when a data link start positional relationship has been established between the moving object and the other moving object, and performs a process that produces a data link effect. Whether or not the data link start positional relationship has been established between the moving object and the other moving object may be determined based on position information about the moving object, position information about the other moving object, and a data link start positional relationship determination parameter (e.g., start distance described later), for example. For example, it is determined that the data link start positional relationship has been established when it has been determined that the distance between the moving object and the other moving object has decreased to the data link start distance based on the position information and the determination parameter.

The data link processing section 210 performs a data link effect production process when the data link activation condition has been satisfied. Specifically, the data link processing section 210 performs a data link effect production process (process that produces the data link effect) that changes at least one of the radar-related capability and the performance of the moving object.

Note that an activation condition determination section 212 included in the data link processing section 210 determines whether or not the data link activation condition has been satisfied. A data link effect production processing section 214 included in the data link processing section 210 performs the data link effect production process.

A data link process is a process that imitates a data link in the real world during the game. The data link process changes the radar-related capability (e.g., radar performance, lock-on performance, or radar weapon capability) or the performance (e.g., attack capability, defense capability, or moving capability) of the moving object on the assumption that information is shared between the moving object and the other moving object. For example, when it has been determined that the data link start positional relationship has been established between the moving object and the other moving object, it is determined that the data link activation condition has been satisfied, and the data link effect production process is performed that imitates production of the data link effect in the real world during the game. The data link effect production process changes a game parameter relating to the radar-related capability or the performance of the moving object, for example. The data link effect production process instructs the display processing section 220 to perform a display process that displays a display object relating to the data link. The display object relating to the data link is a display object that notifies that player whether or not the data link has been established, a data link status, the details of the data link effect, and the like.

In one embodiment of the invention, the data link processing section 210 performs a process that prohibits production of the data link effect (activation of the data link) during at least one of a given first period after the game has started, and a given second period after production of the data link effect has been canceled. The first period is a period that is counted (measured) from the timing at which it has been determined that the game (mission) has started, for example. Production of the data link effect is prohibited during the first period even when the data link activation condition has been satisfied. The second period is a period that is counted (measured) from the timing at which it has been determined that production of the data link effect has been canceled, for example. Production of the data link effect is prohibited during the second period even when the data link activation condition has been satisfied.

The data link processing section 210 may change the data link start positional relationship determination parameter based on at least one piece of information among status information, game status information, input information, and charge information about a player who operates the moving object or another player who operates the other moving object. For example, the data link processing section 210 changes the data link start positional relationship determination parameter based on the status information, the game status information, the input information, or the charge information about the player or the other player so that a data link start distance decreases or increases.

The status information about the player refers to information that is stored in the storage section 270 included in the game system as information that represents the status of the player. The status information about the player may be information about the game level (e.g., rank) of the player, information about the play time (e.g., total play time or cumulative play time (in the last period)), information about the play count (e.g., total play count or play frequency (in the last period)), or information about a game parameter (e.g., experience value, attack capability, or defense capability) used during the game process, for example.

The game status information may be information that represents the progress of the game, information about a stage or a mission during the game, information about a game space during the game, or information about the state around the player during the game, for example.

The input information about the player refers to information that has been input by the player using the operation section 260, and has been received by the reception section 208, for example. The input information about the player may be instruction information input by the player in order to change the data link start positional relationship, a data link disconnection positional relationship (described later), or the like.

The charge information refers to information about the amount charged to the player. The charge information is used for the charge process performed by the charge processing section 216. The charge information is stored in the charge information storage section 277 included in the storage section 270. For example, personal information (e.g., name, sex, date of birth, and e-mail address) about the player is stored in the storage section 270 as user information. Account information about the player is also stored in the storage section 270 as the user information. The charge information stored in the charge information storage section 277 is linked to the account information about each player. Note that cash (money in the real world) or virtual money used on a network may be charged during the charge process. A right (e.g., game play right or sortie right) that can be acquired by paying cash or virtual money may be also used.

The data link processing section 210 performs a process that cancels production of the data link effect when the data link disconnection positional relationship has been established between the moving object and the other moving object, and a state in which the data link disconnection positional relationship is established has continued for a given disconnection determination time.

Whether or not the data link disconnection positional relationship has been established between the moving object and the other moving object may be determined based on the position information about the moving object, the position information about the other moving object, and a data link disconnection positional relationship determination parameter (e.g., disconnection distance described later), for example. For example, it is determined that the data link disconnection positional relationship has been established when it has been determined that the distance between the moving object and the other moving object has increased to the data link disconnection distance (data link continuation limit distance) based on the position information and the determination parameter.

In one embodiment of the invention, even when it has been determined that the data link disconnection positional relationship has been established, the data link processing section 210 does not immediately perform the process that cancels production of the data link effect. The data link processing section 210 performs the process that cancels production of the data link effect when a state in which the data link disconnection positional relationship is established has continued for a given disconnection determination time. Specifically, production of the data link effect is canceled, and the data link is disconnected when a given time has elapsed in a state in which the moving object and the other moving object are situated away from each other.

In this case, the data link processing section 210 may set at least one of the data link disconnection positional relationship determination parameter and the disconnection determination time based on at least one piece of information among the status information, the game status information, the input information, and the charge information about the player who operates the moving object or the other player who operates the other moving object. For example, the data link processing section 210 changes the data link disconnection positional relationship determination parameter based on the status information, the game status information, the input information, or the charge information about the player or the other player so that a data link disconnection distance decreases or increases. Alternatively, the data link processing section 210 decreases or increases the disconnection determination time based on the status information, the game status information, the input information, or the charge information about the player or the other player.

In one embodiment of the invention, the game processing section 206 performs a process that causes the moving object and the other moving object to depart from an identical position when the game (mission) has started (game start timing), for example. For example, the distance between the moving object and the other moving object when the game has started is equal to or shorter than a given distance (e.g., data link start distance), and the moving object and the other moving object are situated at positions that are determined to be an identical position in the game. After the game has started, the moving object moves to the position according to the operation information input by the player in the direction according to the operation information input by the player, and the other moving object moves to the position according to the operation information input by the other player in the direction according to the operation information input by the other player.

When the moving object and the other moving object are caused to depart from an identical position when the game has started, the data link processing section 210 prohibits production of the data link effect during the given first period after the game has started. This makes it possible to prevent an unnatural situation in which the data link effect is produced immediately after the game has started.

The display processing section 220 performs the display process that displays a display object that notifies the player of information about the data link. Specifically, the display processing section 220 performs at least one of a display process that notifies the player whether or not the data link is established between the moving object and the other moving object, a display process that notifies the player of the data link status, and a display process that notifies the player of the details of the data link effect.

The display process that notifies the player whether or not the data link is established between the moving object and the other moving object is a display process that allows the player to recognize another moving object that is the data link target, and notifies the player that the data link is established between the moving object and the other moving object, for example. For example, when the data link is established between the moving object and the other moving object, the display processing section 220 performs a display process that connects the moving object and the other moving object using a first line. When the data link is not established between the moving object and the other moving object, the display processing section 220 performs a display process that connects the moving object and the other moving object using a second line that differs in pattern from the first line. The above display process makes it possible to notify the player whether or not the data link is established between the moving object and the other moving object. Note that the pattern of the first line and the pattern of the second line may be caused to differ from each other by causing the first line and the second line to differ from each other as to the image drawing pattern, color, texture, brightness, or the like.

The display process that notifies the player of the data link status is a display process that allows the player to visually recognize that the data link is established, or the data link is not established, or production of the data link effect is prohibited, for example.

The display process that notifies the player of the details of the data link effect is a display process that allows the player to visually recognize the details (e.g., type) of the data link effect that is being produced. The display process that notifies the player of the details of the data link effect may be implemented by displaying an icon image or the like that is linked to each of a plurality of data link effects, for example.

The display processing section 220 performs the display process that causes the display state when the data link is established between the moving object and the other moving object to differ from the display state when production of the data link effect is prohibited during the first period or the second period. Specifically, the display processing section 220 performs the display process that allows the player to visually distinguish a case where the data link is established and a case where production of the data link effect is prohibited. This makes it possible for the player to visually recognize the reason why the data link is not established although the moving object and the other moving object are situated sufficiently close to each other, and the data link can be established.

The data link processing section 210 performs a process that changes the radar-related capability of the moving object as the data link effect production process. Specifically, the data link processing section 210 performs at least one of a process that changes the radar performance, a process that changes the lock-on performance, and a process that changes the capability of a weapon that utilizes radar, as the process that changes the radar-related capability of the moving object. The process that changes the radar performance is a process that changes the radar accuracy, a process that changes the radar display performance, or the like. The process that changes the lock-on performance is a process that changes the lock-on range, the lock-on distance, the lock-on speed, or the targeting accuracy after lock-on, or the like. The process that changes the capability of a weapon that utilizes radar is a process that changes the guidance performance, the targeting accuracy, or the attack capability relating to a weapon that utilizes radar, or the like.

The data link processing section 210 may perform a process that changes the performance of the moving object as the data link effect production process. For example, the data link processing section 210 changes the moving speed, the turning performance, the moving capability, the attack capability, the durability, or the like of the moving object on the assumption that the information-gathering capability or the like of the moving object is improved due to the data link effect.

Note that the data link effect production process may also be various other processes such as a process that causes the moving object not to be easily locked on (captured) by an enemy, or a process that decreases the targeting (lock-on) accuracy of an enemy on the assumption that the intensity of interference waves increases due to the data link effect.

The game system may allow the player to select the desired data link effect in advance before starting the game. When the data link has been established during the game, the data link processing section 210 performs the data link effect production process so that the data link effect selected in advance from a plurality of data link effects is produced.

The data link processing section 210 may set at least one of the data link activation condition and the data link effect based on at least one piece of information among the status information, the game status information, the input information, and the charge information about the player who operates the moving object or the other player who operates the other moving object. For example, the data link processing section 210 controls the data link activation condition so that the data link activation condition is easily satisfied, or is satisfied with difficulty, based on given information such as the status information, the game status information, the input information, or the charge information about the player or the other player. For example, the data link processing section 210 controls the data link activation condition so that the data link activation condition is satisfied, or is not satisfied, depending on the given information such as the status information about the player even when the moving object and the other moving object have an identical positional relationship.

Figure 2A:
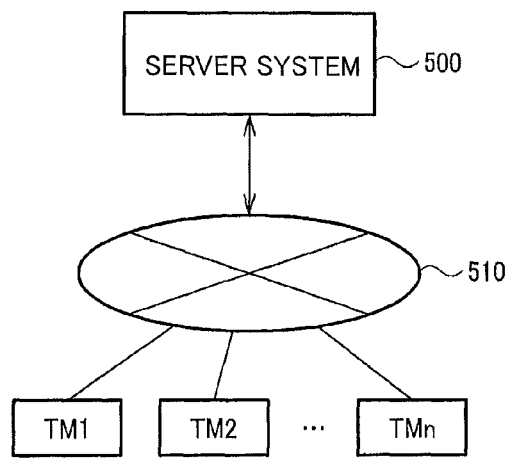
FIGS. 2A to 2E are views illustrating a network configuration and a terminal device.

FIG. 2A is a view illustrating an example of the network configuration of the game system according to one embodiment of the invention. In FIG. 2A, a server system 500 (information processing system) is connected to terminal devices TM1 to TMn through a network 510. For example, the server system 500 is a host, and the terminal devices TM1 to TMn are clients.

The server system 500 may be implemented by one or a plurality of servers (e.g., management server, game server, charge server, service providing server, content distribution server, authentication server, database server, or communication server), for example. The server system 500 provides various services for a community-type website and an online game. The server system 500 manages data necessary for implementing (executing) the game, and distributes a client program, various types of data, and the like.

The network 510 (distribution network or communication line) is a communication channel that utilizes the Internet, a wireless LAN, and the like. The network 510 may include a communication network such as a LAN that utilizes a private line (private cable) for direct connection, Ethernet (registered trademark), and the like, a telecommunication network, a cable network, and a wireless LAN. The communication method may be either a cable communication method or a wireless communication method.

Figure 2B:
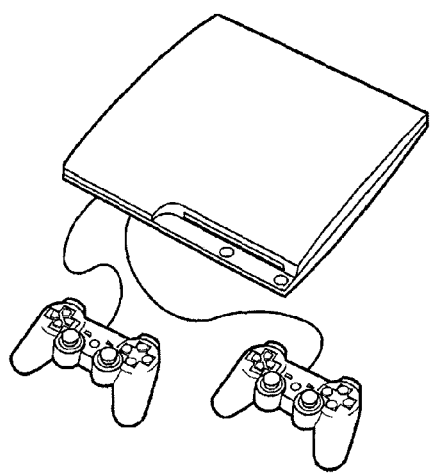
Figure 2C:
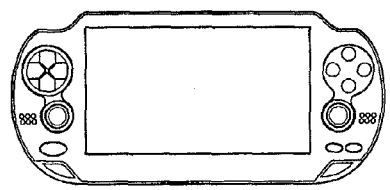
Figure 2D:
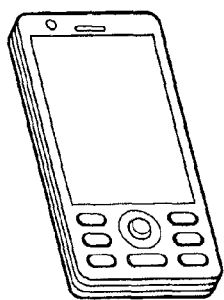
Figure 2E:
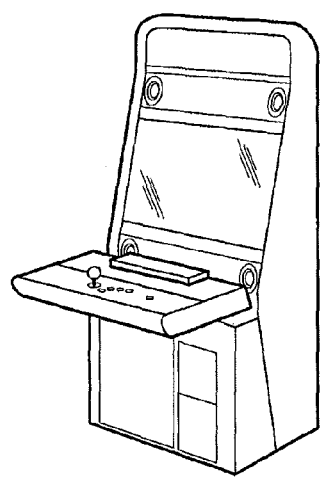

The terminal devices TM1 to TMn (player terminals) are terminals having a network connection function (Internet connection function), for example. The terminal devices TM1 to TMn may be a consumer game device (stationary game device) (see FIG. 2B), a portable game device (see FIG. 2C), a portable communication terminal (smartphone, feature phone, or mobile phone) (see FIG. 2D), an arcade game device (see FIG. 2E), or the like. An information processing device such as a personal computer (PC) or a tablet computer may also be used as the terminal devices TM1 to TMn.

The game system according to one embodiment of the invention may be implemented by the terminal devices (TM1 to TMn) illustrated in FIGS. 2A to 2E, for example. Alternatively, the game system according to one embodiment of the invention may be implemented by the server system 500, or may be implemented by distributed processing performed by the terminal device and the server system 500.

Figure 3:
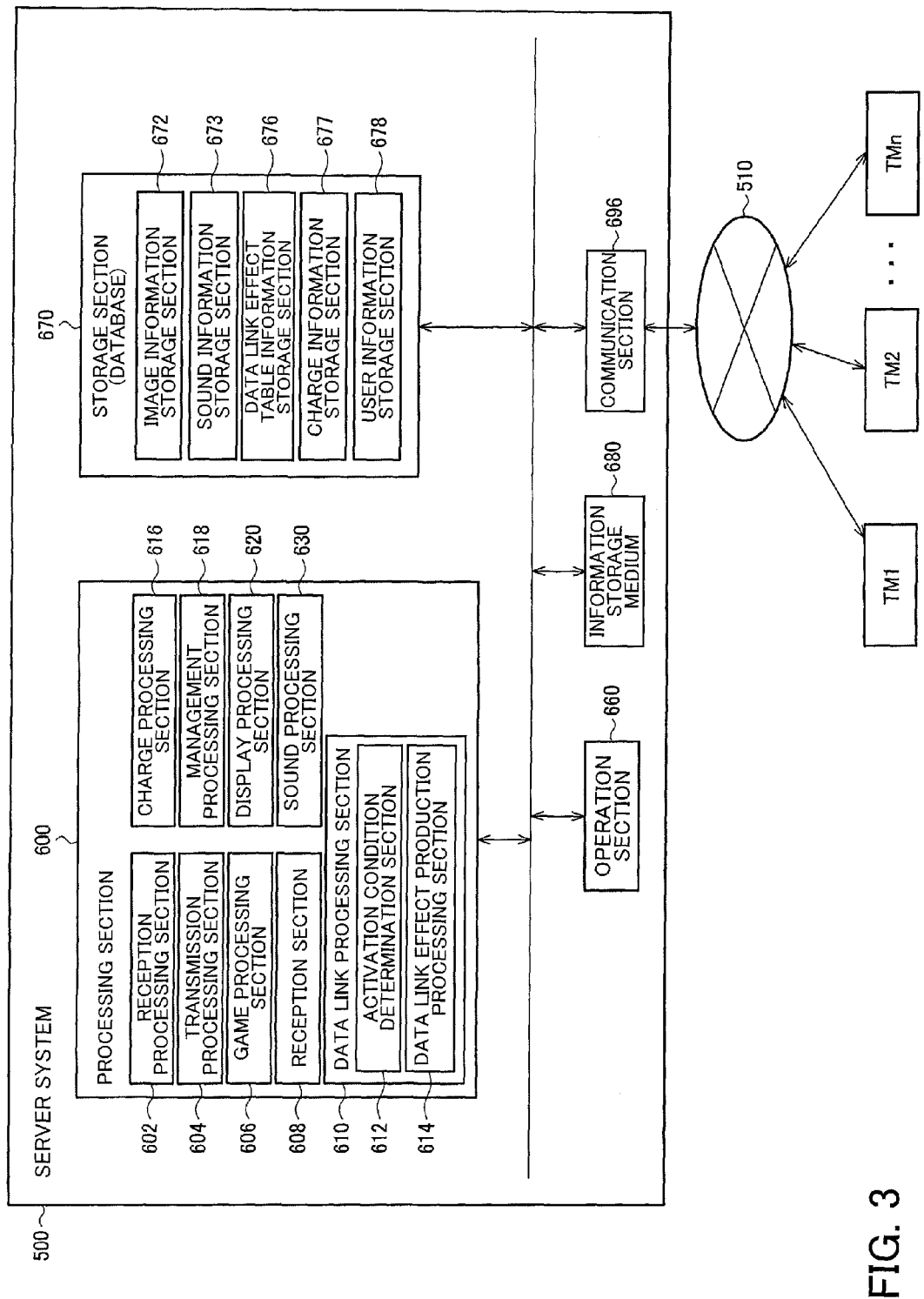
FIG. 3 illustrates a configuration example of a server system according to one embodiment of the invention.

FIG. 3 illustrates a configuration example when the game system according to one embodiment of the invention is implemented by the server system 500. The server system 500 illustrated in FIG. 3 includes a processing section 600, an operation section 660, a storage section 670, and a communication section 696.

The processing section 600 performs various processes necessary for implementing various types of service/management provided by the server based on data received through the communication section 696, data stored in the storage section 670, a program, and the like. The function of the processing section 600 may be implemented by hardware such as a processor (e.g., CPU or GPU) or an ASIC (e.g., gate array), or a program.

The processing section 600 includes a reception processing section 602, a transmission processing section 604, a game processing section 606, a reception section 608, a data link processing section 610, a charge processing section 616, a management processing section 618, a display processing section 620, and a sound processing section 630.

The reception processing section 602 performs a reception process that receives information from the terminal device or the like. The transmission processing section 604 performs a transmission process that transmits information to the terminal device or the like. The reception process includes a process that instructs the communication section 696 to receive information, a process that acquires information received by the communication section 696, and writes the acquired information into the storage section 670, and the like. The transmission process includes a process that instructs the communication section 696 to transmit information, a process that indicates the transmission target information to the communication section 696, and the like.

The game processing section 606, the reception section 608, the data link processing section 610, and the charge processing section 616 respectively perform (as the server system) a game process, a reception process, a data link process, and a charge process similar to those performed by the game processing section 206, the reception section 208, the data link processing section 210, and the charge processing section 216 described above with reference to FIG. 1, and detailed description thereof is omitted. The game process, the reception process, the data link process, and the charge process may be implemented by the terminal device, or may be implemented by the server system (e.g., cloud). The game process, the reception process, the data link process, and the charge process may be implemented by distributed processing performed by the terminal device and the server system.

The management processing section 618 performs a server management process. For example, the management processing section 610 performs a management process that manages various services provided by the server, and a management process that manages information such as server management information.

The display processing section 620 performs a process for displaying an image on the display section of the terminal device. The sound processing section 630 performs a process for outputting various types of sound from the sound output section of the terminal device. For example, the display processing section 620 generates image information that is info ration for generating an image, and the sound processing section 630 generates sound information that is information for generating sound (voice, game sound, or effect sound). The image information is information for each terminal device to generate and display an image generated by the method according to one embodiment of the invention. The image information may be image data, or may be data (e.g., display screen setting data or object data) for each terminal device to generate and display an image. This also applies to the sound information generated by the sound processing section 630.

The display processing section 620 performs (as a server system) a display process similar to that performed by the display processing section 220 described above with reference to FIG. 1, and detailed description thereof is omitted.

The operation section 660 allows the system administrator (operator) to input various types of information.

The storage section 670 serves as a work area for the processing section 600, the communication section 696, and the like. The function of the storage section 670 may be implemented by a RAM, an SSD, an HDD, or the like.

The storage section 670 includes an image information storage section 672, a sound information storage section 673, a data link effect table information storage section 676, a charge information storage section 677, and a user information storage section 678. The image information storage section 672 stores the image information generated by the display processing section 620, and the sound information storage section 673 stores the sound information generated by the sound processing section 630. The data link effect table information storage section 676 and the charge information storage section 677 store information similar to those stored in the data link effect table information storage section 276 and the charge information storage section 277 described above with reference to FIG. 1.

The user information storage section 678 stores personal information (e.g., name, sex, date of birth, and e-mail address) about the player as user information. For example, account information about the player and the like are stored as the user information. The charge information is linked to the account information about each player.

An information storage medium 680 stores a program, data, and the like. The function of the information storage medium 680 may be implemented by an optical disk, a memory, an HDD, or the like.

The communication section 696 communicates with the terminal devices TM1 to TMn or another external server through the cable/wireless network 510. The function of the communication section 696 may be implemented by hardware (e.g., communication ASIC or communication processor), or communication firmware.

Note that the process (e.g., game process, reception process, sharing process, and recording process) according to one embodiment of the invention may be implemented by causing the terminal device to execute the game program, or may be implemented by executing a web browser program or script control. For example, the process according to one embodiment of the invention may be implemented as a browser game that acquires information necessary for the game through a communication line (e.g., Internet), and implements an interactive display on a browser.

2. Method

The method according to one embodiment of the invention is described in detail below. Although an example in which the game system according to one embodiment of the invention is applied to a fighter aircraft game is mainly described below, the game system according to one embodiment of the invention is not limited thereto. For example, the game system according to one embodiment of the invention may be applied to various games such as a role-playing game (RPG), an action game, a strategy simulation game, a breeding game, a card game, a driving game, or a sport game. In such a case, the moving object is an object (e.g., character, ship, car, train, animal, or robot) that appears in the game, and moves in the game space.

2.1 Data Link Process

The game system according to one embodiment of the invention is configured so that the server system and the terminal device (player terminal) are connected through a network, and the player can enjoy playing a network game with another player.

Figure 4:
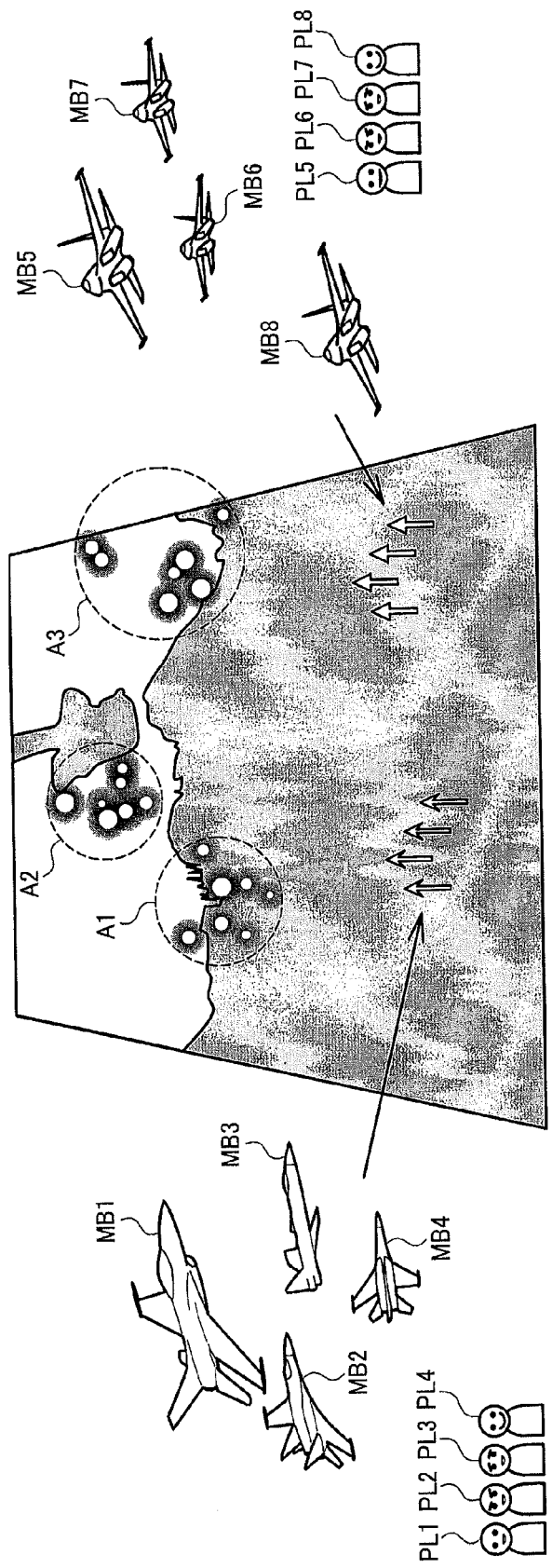
FIG. 4 is a view illustrating a team battle mode.

FIG. 4 is a view illustrating a team battle mode (i.e., game mode) that is implemented by the network game. In the team battle mode, players PL1 to PL4 who play the online game in real time select the desired fighter aircraft/weapon, and form a team consisting of up to four fighter aircraft MB1 to MB4 (moving objects in a broad sense). Players PL5 to PL8 who compete with the players PL1 to PL4 also form a team consisting of up to four fighter aircraft MB5 to MB8, and make a sortie as a rival unit that belongs to the same camp as the players PL1 to PL4, and competes with the players PL1 to PL4 for military results.

As illustrated in FIG. 5, the fighter aircraft MB1 to MB4 that form a team make a sortie from a base, an aircraft carrier, or the like situated in a battlefield to attack the enemy position.

The game is designed so that the teams arbitrarily attack non-player characters (NPC) that belong to the enemy force and are situated in positions A1 to A3 on a map within a given time limit, and one of the teams with a higher total score wins the game. It is desirable that each fighter aircraft make an appropriate attack (e.g., an attack aircraft mainly makes a ground attack, and a fighter aircraft mainly engages in an aerial battle) in order to win the game. The team battle mode allows the player to play the game as desired in cooperation with other members, and determine his skill while caring for other members. Since the rival team also engages in a battle aimed to achieve a high score, the player can enjoy plotting various strategies (e.g., scoring high points by defeating a high-ranking enemy NPC prior to the rival team, or scoring high points by defeating a large number of enemy NPC while the rival team has difficulty with defeating a high-ranking NPC).

When the time limit has elapsed, and the game has ended, the score of each member of each team is added up to calculate the total score of each team, and a team with a higher score is determined to have won the game. Each player who belongs to the winning team can enjoy a feeling of accomplishment that his team has defeated the rival team, and each player who belongs to the losing team can also enjoy a feeling of accomplishment since he is regarded as a pilot who contributed to the battle.

When implementing such a network game, it is important to create a sense of unity between the player and the friend player who belong to the same team. For example, since the game space where the fighter aircraft travels is very large, the distance between the fighter aircraft operated by the player (hereinafter may be appropriately referred to as "player fighter aircraft") and the fighter aircraft operated by a friend player (hereinafter may be appropriately referred to as "friend fighter aircraft") easily increases. Therefore, the player may feel as if he is battling alone in a remote place, and may not develop a sense of unity with the friend players.

In order to solve the above problem, the method according to one embodiment of the invention employs the data link process that imitates a data link employed for fighter aircraft and the like in the real world as a game process.

Specifically, the data link process determines whether or not the data link activation condition has been satisfied based on the positional relationship between the player fighter aircraft (moving object in a broad sense) and the friend fighter aircraft (another moving object in a broad sense), and produces the data link effect when the data link activation condition has been satisfied.

The data link process makes it possible to create a sense of unity between the player and the friend player, and allow the player to enjoy interpersonal cooperation and cooperative play. Specifically, it is possible to allow the player to feel that he is playing the game in cooperation with a real human player instead of an NPC. Since the radar performance and the aircraft performance of the player fighter aircraft are improved by the data link process, even an unskilled player who often fails to shoot down an enemy fighter aircraft in an aerial battle can reliably shoot down an enemy fighter aircraft.

Figure 6A:
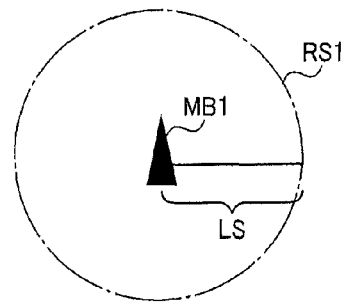
FIGS. 6A to 6C are views illustrating a data link activation/disconnection determination process.
Figure 6B:
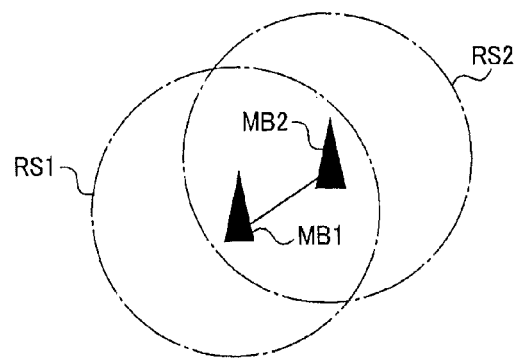
Figure 6C:
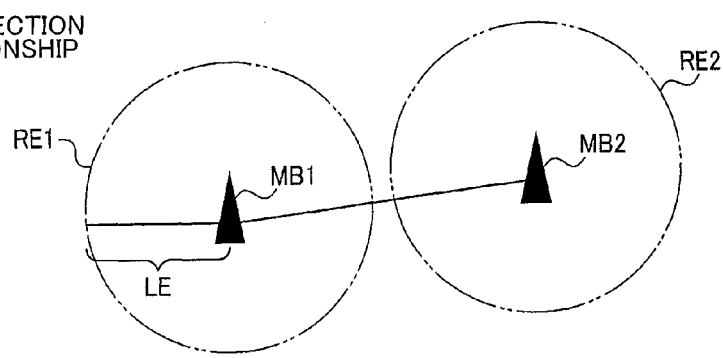

FIGS. 6A to 6C are views illustrating an example of the data link activation/disconnection determination process.

As illustrated in FIG. 6A, a data link start distance LS (parameter) is set to each fighter aircraft. A data link start distance range RS1 is set around the player fighter aircraft MB1 using the data link start distance LS, for example. The data link start distance range RS1 is a spherical range having a radius equal to the data link start distance LS, for example. Note that the data link start distance LS may be variably set corresponding to each fighter aircraft. The data link start distance LS corresponds to about 500 m to about 2 km, for example.

FIG. 6B is a view illustrating the data link start positional relationship. For example, when the friend fighter aircraft MB2 has entered the data link start distance range RS1 of the player fighter aircraft MB1, it is determined that the data link start positional relationship has been established, and the process that produces the data link effect is performed. Likewise, when the player fighter aircraft MB1 has entered the data link start distance range RS2 of the friend fighter aircraft MB2, it is determined that the data link start positional relationship has been established, and the process that produces the data link effect is performed. Specifically, the data link is activated when an arbitrary fighter aircraft has entered the data link start distance range of another fighter aircraft that belongs to the same team.

Whether or not to activate the data link is determined without taking account of the direction and the speed of the fighter aircraft, for example. When a plurality of fighter aircraft are present within the data link start distance range RS1 of the player fighter aircraft MB1, the data link is performed between the player fighter aircraft MB1 and the fighter aircraft that is situated closest to the player fighter aircraft MB1 (i.e., the data link is not performed between the player fighter aircraft MB1 and a plurality of fighter aircraft). Note that a modification is also possible in which the data link is performed between the player fighter aircraft MB1 and a plurality of fighter aircraft.

For example, when the data link is established between a fighter aircraft MA and a fighter aircraft MB respectively operated by a player PA and a player PB who play the network online game, the data link may be established between the fighter aircraft MA operated by the player PA and a fighter aircraft MC operated by a player PC who plays the network online game on the screen of the player PC. For example, when a network game is designed to implement data communication using an asynchronous system, the positional relationship (position coordinates) between the fighter aircraft MA and the fighter aircraft MC on the screen of the player PA may not coincide with the positional relationship between the fighter aircraft MA and the fighter aircraft MC on the screen of the player PC. Specifically, the asynchronous system gives priority to the transmission speed (response and immediacy), and does not ensure that the position coordinates of the fighter aircraft MA operated by the player PA and the position coordinates of the fighter aircraft MC operated by the player PC reach the game device of the player PA and the game device of the player PC at the same timing.

FIG. 6C is a view illustrating the data link disconnection positional relationship. As illustrated in FIG. 6C, a data link disconnection distance LE (data link continuation limit distance) (parameter) is set to each fighter aircraft. A data link disconnection distance range RE1 is set around the player fighter aircraft MB1 using the data link disconnection distance LE, for example. The data link disconnection distance range RE1 is a spherical range having a radius equal to the data link disconnection distance LE, for example.

For example, when a disconnection determination time TE has elapsed in a state in which the friend fighter aircraft MB2 is situated away from the data link disconnection distance range RE1 of the player fighter aircraft MB1 (i.e., in a state in which the data link disconnection positional relationship is established), it is determined that the data link has been disconnected, and production of the data link effect is canceled.

Note that the data link disconnection distance LE may also be variably set corresponding to each fighter aircraft. Therefore, the data link disconnection distance LE of the player fighter aircraft MB1 may differ from the data link disconnection distance LE of the friend fighter aircraft MB2. In such a case, it is determined that the data link has been disconnected, and production of the data link effect is canceled when the disconnection determination time TE has elapsed in a state in which the player fighter aircraft MB1 and the friend fighter aircraft MB2 are situated away from each other at a distance longer than the data link disconnection distance LE of the player fighter aircraft MB1 or the data link disconnection distance LE of the friend fighter aircraft MB2, whichever is longer (i.e., in a state in which the data link disconnection positional relationship is established).

Note that the data link state is not canceled when the player fighter aircraft MB1 and the friend fighter aircraft MB2 are situated within the range defined by the data link disconnection distance LE of the player fighter aircraft MB1 or the data link disconnection distance LE of the friend fighter aircraft MB2, whichever is longer, or when the player fighter aircraft MB1 and the friend fighter aircraft MB2 have entered the range defined by the data link disconnection distance LE of the player fighter aircraft MB1 or the data link disconnection distance LE of the friend fighter aircraft MB2, whichever is longer, within the disconnection determination time TE.

FIG. 7A is a view illustrating the determination parameters (i.e., start distance LS, disconnection distance LE, and disconnection determination time TE). The start distance LS is a determination parameter that represents the data link activation distance. The disconnection distance LE (termination distance) is a determination parameter that represents the data link continuation limit distance. The disconnection determination time TE is a determination parameter that represents the time until the data link is disconnected after the player fighter aircraft and the friend fighter aircraft have been situated outside the range defined by the disconnection distance.

In one embodiment of the invention, the start distance LS (i.e., data link start positional relationship determination parameter), the disconnection distance LE (i.e., data link disconnection positional relationship determination parameter), and the disconnection determination time TE (i.e., disconnection determination time determination parameter) are changed based on at least one piece of information among the status information, the game status information, the input information, and the charge information about the player who operates the player fighter aircraft MB1 (a player who operates a moving object in a broad sense) or the player who operates the friend fighter aircraft MB2 (another player who operates another moving object in a broad sense) (see FIG. 7B).

For example, the determination parameters such as the start distance LS, the disconnection distance LE, and the disconnection determination time TE are variably changed based on information about the game level (e.g., rank) of the player, information about the progress of the game, information about the game play count/play time, or information about the amount (cash or virtual money) paid by the player. For example, the start distance LS, the disconnection distance LE, and the disconnection determination time TE are decreased when the game level of the player is high. In this case, since a strict condition is set as the data link activation/disconnection condition, it is possible to increase the difficulty level of the game played by the player.

When the play count of the player is larger, or when the play time of the player is long, the start distance LS, the disconnection distance LE, and the disconnection determination time TE are increased as a bonus to the player, for example. In this case, since a moderate condition (advantageous condition) is set as the data link activation/disconnection condition, it is advantageous to the player.

When the player has paid a large amount (cash or virtual money) (i.e., when the player has been charged a large amount), the start distance LS, the disconnection distance LE, and the disconnection determination time TE are increased, for example. In this case, since a moderate condition is set as the data link activation/disconnection condition, it is advantageous to the player.

Note that the data link activation/disconnection determination process is not limited to the process described above with reference to FIGS. 6A to 6C, and the like. For example, when the start distance range RS1 of the player fighter aircraft MB1 and the start distance range RS2 of the friend fighter aircraft MB2 have intersected each other in FIG. 6B, it may be determined that the data link start positional relationship has been established, and the data link may be activated. This also applies to disconnection of the data link.

2.2 Data Link Effect Production Prohibition Period

A data link system is employed for fighter aircraft in the real world. If the data link process employed in the real world is applied directly to a game, the player may feel inconsistency during the game, or the game may not progress smoothly, for example.

In the team battle mode described above with reference to FIG. 4, when the game has started as illustrated in FIG. 5, the player fighter aircraft and the friend fighter aircraft make a sortie from the same position (base or aircraft carrier), for example. Therefore, the distance between the player fighter aircraft and the friend fighter aircraft is very short after the game has started, and the data link is established (see FIGS. 6A and 6B). When the data link has been established, the data link effect is produced, and the game play state is set to be advantageous to the player (described later).

The distance between the player fighter aircraft and the friend fighter aircraft increases after the player fighter aircraft and the friend fighter have made a sortie from the same position, and the data link is disconnected. Therefore, the process that produces the data link effect is canceled, and the game play state is set to be disadvantageous to the player.

Specifically, an unnatural situation occurs in which the game play state is set to be advantageous to the player during a given period after the game has started due to establishment of the data link, and is set to be disadvantageous to the player when the distance between the player fighter aircraft and the friend fighter aircraft has increased, and the data link has been disconnected. Since the player considers that the game play state is normal during a given period after the game has started, the player feels inconsistency if the gameplay state is then set to be disadvantageous to the player.

Figure 8:
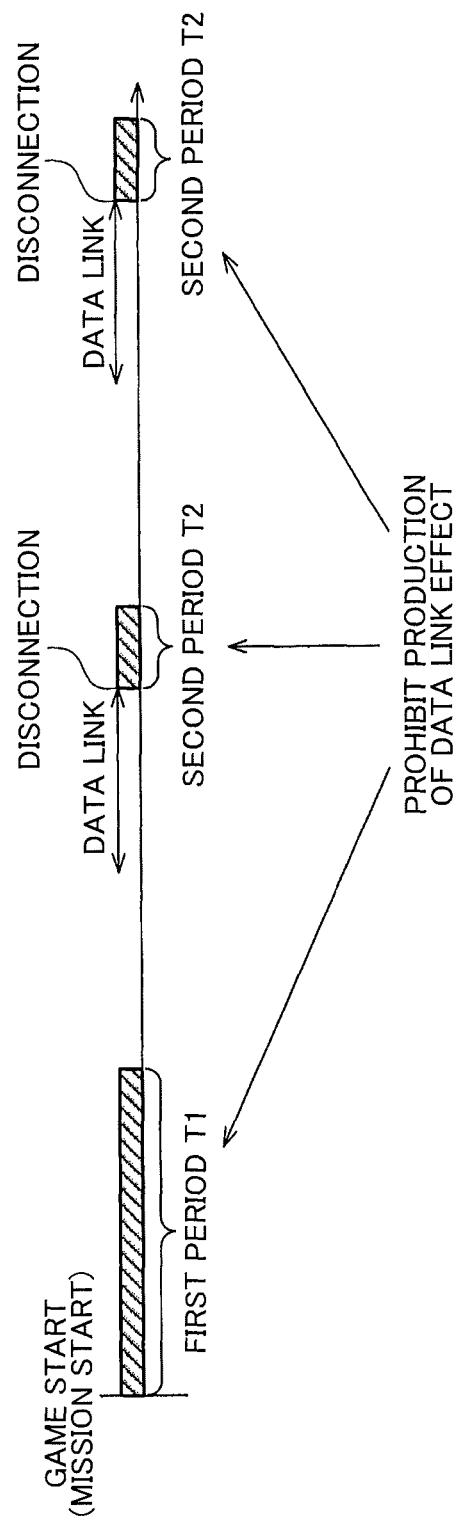
FIG. 8 is a view illustrating a method that sets a data link effect production prohibition period.

In order to solve the above problem, the method according to one embodiment of the invention employs a process that prohibits production of the data link effect (activation of the data link) during a first period T1 after the game has started (see FIG. 8). The first period T1 is a period of about 50 to 150 seconds, for example.

According to this configuration, since production of the data link effect is prohibited during the first period T1 after the game has started when the player fighter aircraft and the friend fighter aircraft have made a sortie from the same position (see FIG. 5), the data link effect is not produced, and the player can perform game play with a normal setting. When the distance between the player fighter aircraft and the friend fighter aircraft has decreased after the first period T1 has elapsed, and the data link activation condition has been satisfied, the data link effect is produced, and the player can perform game play with an advantageous setting. Therefore, the player can appropriately recognize the data link effect. This makes it possible to create a sense of unity between the player and the friend player, and allow the player to enjoy interpersonal cooperation and cooperative play.

The method according to one embodiment of the invention also employs a process that prohibits production of the data link effect during a second period T2 after production of the data link effect has been canceled (i.e., after the data link has been disconnected) (see FIG. 8). It is possible to prevent a situation in which the data link is activated too frequently by setting the second period T2 that corresponds to a standby period. If the data link is activated too frequently, the player cannot smoothly perform game play, for example. Such a problem can be solved by prohibiting production of the data link effect during the second period T2 after the data link has been disconnected.

The second period T2 also serves as a penalty imposed on the player for disconnection of the data link. Specifically, the method according to one embodiment of the invention prompts the player fighter aircraft and the friend fighter aircraft to battle in cooperation while maintaining the distance between the player fighter aircraft and the friend fighter aircraft as short as possible by employing the data link process. This aims to create a sense of unity between the player and the friend player. Therefore, the second period T2 is set as a period in which a penalty is imposed on the player when the distance between the player fighter aircraft and the friend fighter aircraft has increased after the distance between the player fighter aircraft and the friend fighter aircraft has decreased, and the data link has been activated, and production of the data link effect is prohibited during the second period T2. This makes it possible to prompt the player to battle while maintaining the distance between the player fighter aircraft and the friend fighter aircraft as short as possible, and allow the player to further enjoy a sense of unity and interpersonal cooperation.

2.3 Data Link Display Process

Figure 9:
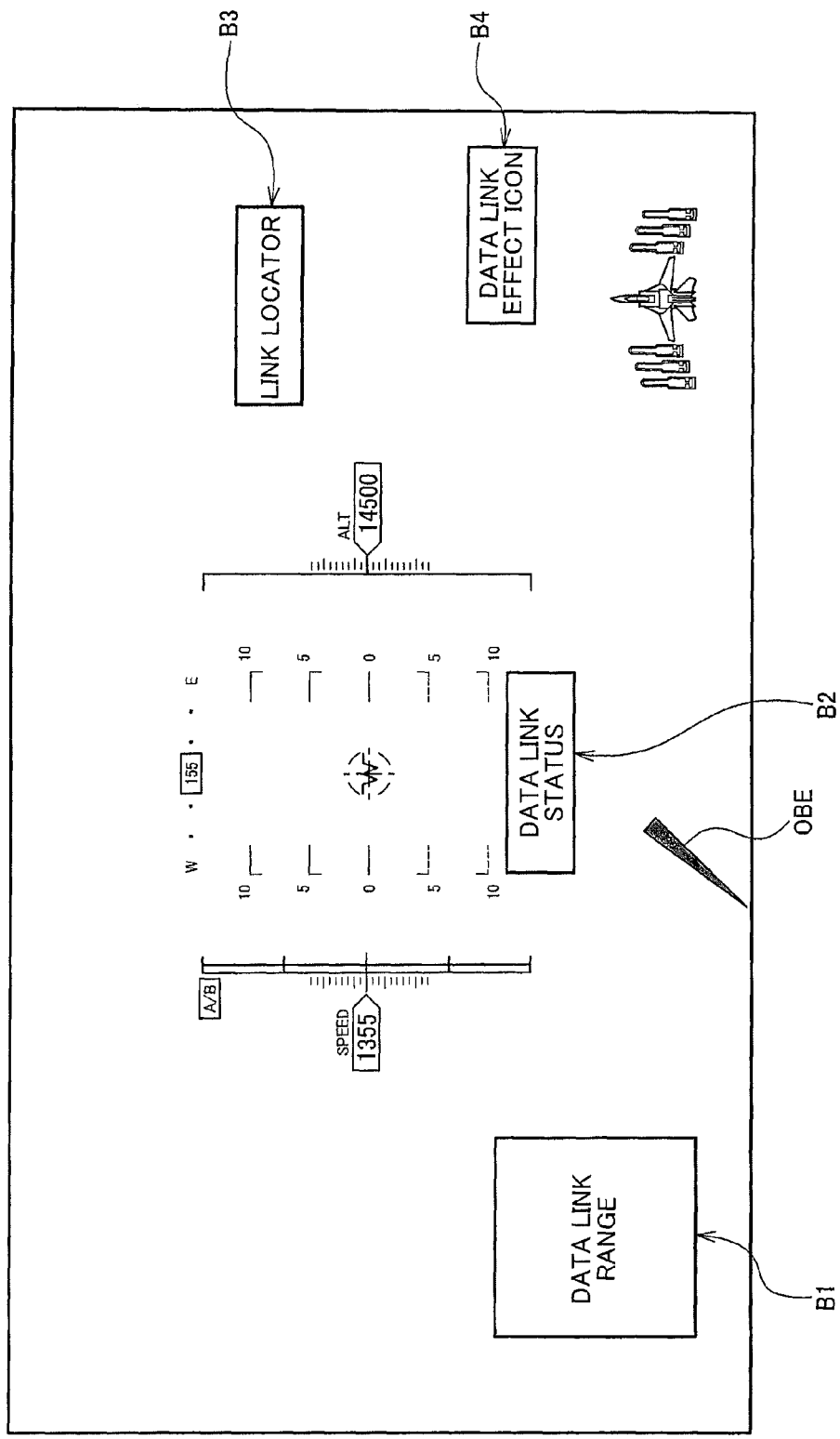
FIG. 9 is a view illustrating a method that implements a data link display process.
Figure 13:
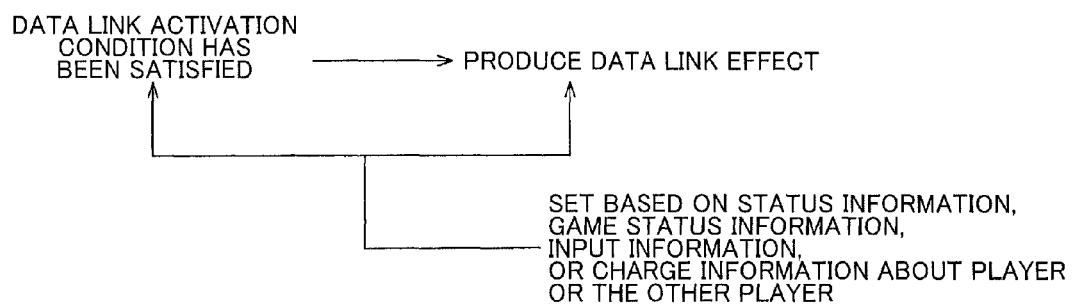
FIG. 13 is a view illustrating a method that sets a data link activation condition and a data link effect based on status information or the like about a player.

A data link display process is described below. FIG. 9 illustrates an example of a game screen displayed to the player. In FIG. 9, normal cross hairs, a data link range (see B1), a data link status (see B2), a link locator display (see B3), and a data link effect icon (see B4) are displayed.

FIGS. 10A to 10C illustrate an example of the data link range indicated by B1 in FIG. 9. Specifically, the data link range of the player fighter aircraft and the friend fighter aircraft is displayed on a radar screen. The data link range display process is an example of the display process that notifies the player whether or not the data link is established between the player fighter aircraft and the friend fighter aircraft (i.e., between a moving object and another moving object).

For example, the display process illustrated in FIG. 10A is performed on the radar screen when the data link is established. Specifically, when the data link is established between the player fighter aircraft MB1 and the friend fighter aircraft MB2, the display process that connects the player fighter aircraft MB1 and the friend fighter aircraft MB2 using a first line is performed. This makes it possible for the player to visually and immediately recognize that the data link is established between the player fighter aircraft MB1 and the friend fighter aircraft MB2.

The display process illustrated in FIG. 10B is performed on the radar screen when the data link is disconnected. Specifically, when the data link is not established between the player fighter aircraft MB1 and the friend fighter aircraft MB2, the display process that connects the player fighter aircraft MB1 and the friend fighter aircraft MB2 using a second line is performed. The image pattern of the second line illustrated in FIG. 10B differs from the image pattern of the first line illustrated in FIG. 10A. For example, the image pattern of the first line illustrated in FIG. 10A is a solid pattern, and the image pattern of the second line illustrated in FIG. 10B is a dotted pattern. Note that the pattern of the first line and the pattern of the second line may be caused to differ from each other in various ways. For example, the pattern of the first line and the pattern of the second line may differ from each other as to the color, brightness, translucency, or the like.

FIG. 10C illustrates an example of the display process performed during the first period T1 and the second period T2 in which production of the data link effect is prohibited (see FIG. 8). In the first period T1 and the second period T2, the display process that connects the player fighter aircraft MB1 and the friend fighter aircraft MB2 using a line (see FIGS. 10A and 10B) is not performed. Specifically, the display state when the data link is established between the player fighter aircraft MB1 and the friend fighter aircraft MB2 (see FIG. 10A) differs from the display state when production of the data link effect is prohibited during the first period T1 or the second period T2 (see FIG. 10C). This makes it possible for the player to visually recognize reason why the data link is not established although the player fighter aircraft MB1 and the friend fighter aircraft MB2 are situated within the data link start distance range. Therefore, it is possible to suppress a situation in which the player may feel unnatural when the data link is not established.

FIGS. 11A and 11B illustrate an example of the data link status indicated by B2 in FIG. 9. The display process that displays the data link status corresponds to the display process that notifies the player of the data link status. For example, when the data link is established, the player is notified that the data link status is active (see FIG. 11A). When production of the data link effect is prohibited during the first period T1 or the second period T2 (see FIG. 8), the player is notified that production of the data link effect is prohibited, and the data link status is a standby period (see FIG. 11B).

FIG. 11C illustrates an example of the link locator indicated by B3 in FIG. 9. In FIG. 9, an enemy locator OBE indicates the direction in which an enemy fighter aircraft is present, for example. In FIG. 11C, a link locator OBM indicates the direction in which a friend fighter aircraft (data link candidate) is present. The distance to the friend fighter aircraft, and the name of the player who operates the friend fighter aircraft are also displayed.

FIG. 11D illustrates an example of the data link effect icon indicated by B4 in FIG. 9. The display process that displays the data link effect icon corresponds to the display process that notifies the player of the details of the data link effect. The player can visually recognize the details of the data link effect by observing the data link effect icon.

2.4 Data Link Effect

FIG. 12 illustrates an example of the data link effect table stored in the data link effect table information storage section 276 illustrated in FIG. 1. The process that produces the data link effect is performed using the data link effect table.

In one embodiment of the invention, the data link effect differs corresponding to the acquired rank (level) of the player. The player selects the desired data link effect that is produced when the data link is established before starting game play. For example, the player selects the desired data link effect that is produced when the data link is established on an equipment screen as sortie equipment before starting game play. Therefore, the data link effect selected in advance is produced when the data link activation condition described with reference to FIGS. 6A and 6B has been satisfied.

When the rank of the player is a rank RK1, the player can select only the basic-set data link effect. The basic-set data link effect increases the guidance performance (e.g., missile guidance performance), the Blaze performance, and the lock-on speed.

When the rank of the player is a rank RK2, the player can select the critical data link effect in addition to the basic-set data link effect. The critical data link effect increases the missile power or the like on the assumption that the targeting accuracy increases due to the data link.

When the rank of the player is a rank RK3, the player can also select the long-range data link effect. The long-range data link effect increases the lock-on distance (e.g., missile lock-on distance) and the lock-on range.

When the rank of the player is a rank RK4, the player can also select the high-homing+ data link effect. The high-homing+ data link effect further increases the guidance performance as compared with the basic-set data link effect.

When the rank of the player is a rank RK5, the player can also select the quick-turn data link effect. The quick-turn data link effect increases the quick-turn capability (i.e., a capability to make a quick turn without a stall) on the assumption that air force data in the peripheral airspace can be shared through the data link.

When the rank of the player is a rank RK6, the player can also select the anti-stall data link effect. The anti-stall data link effect increases the Anti-stall performance on the assumption that air force data in the peripheral airspace can be shared through the data link. Note that detailed description of the data link effect corresponding to a rank RK7 and the data link effect corresponding to a rank RK8 is omitted.

According to one embodiment of the invention, the process that changes the radar-related capability of the player fighter aircraft (moving object) is performed as the process that produces the data link effect. For example, the process that increases the guidance performance (e.g., missile guidance performance), the Blaze performance, and the missile power (i.e., a process that changes the capability of a weapon that utilizes radar), the process that changes the lock-on performance (lock-on distance and lock-on range), and the like are performed as the process that produces the data link effect. The process that changes the performance of the player fighter aircraft (moving object) is also performed as the process that produces the data link effect. Specifically, the process that increases the quick-turn capability and the Anti-stall performance of the player fighter aircraft is performed on the assumption that air force data in the peripheral airspace can be shared through the data link.

2.5 Setting of Data Link Activation Condition and Data Link Effect

In one embodiment of the invention, the data link activation condition and the data link effect are set based on the status information, the game status information, the input information, or the charge information about the player who operates the player fighter aircraft (hereinafter may be appropriately referred to as "player") or another player who operates the friend fighter aircraft (hereinafter may be appropriately referred to as "friend player"), for example. FIGS. 14A to 14C illustrate specific examples.

For example, when the level (status in a broad sense) of the player (player or friend player (hereinafter the same)) is high (see FIG. 14A), the data link start distance LS and the data link disconnection distance LE described with reference to FIG. 7A become short, and the start distance range RS and the disconnection distance range RE become narrow. Specifically, the data link activation condition is set to be disadvantageous to the player.

When the level of the player is high, the data link effect is set so that low performance is obtained. For example, the guidance performance, the lock-on performance, the Anti-stall performance, and the like (see FIG. 12) are decreased. Specifically, the data link effect is set to be disadvantageous to the player.

When the level of the player is low, the data link start distance LS and the data link disconnection distance LE become long, and the start distance range RS and the disconnection distance range RE become wide. Specifically, the data link activation condition is set to be advantageous to the player.

When the level of the player is low, the data link effect is set so that high performance is obtained. For example, the guidance performance, the lock-on performance, the Anti-stall performance, and the like are increased. Specifically, the data link effect is set to be advantageous to the player.

This makes it possible to utilize the data link activation condition and the data link effect as an element for handicapping the player.

As illustrated in FIG. 14B, when the play count (or the play time (hereinafter the same)) of the player is small, the data link start distance LS and the data link disconnection distance LE become short. Specifically, the data link activation condition is set to be disadvantageous to the player.

When the play count of the player is small, the data link effect is set to be disadvantageous to the player.

When the play count of the player is large, the data link start distance LS and the data link disconnection distance LE become long. Specifically, the data link activation condition is set to be advantageous to the player.

When the play count of the player is large, the data link effect is set to be advantageous to the player.

According to this configuration, the data link activation condition and the data link effect are set to be advantageous to the player as the play count or the play time of the player increases. Therefore, it is possible to prompt the player to play the game.

As illustrated in FIG. 14C, when the amount charged to the player is small, the data link start distance LS and the data link disconnection distance LE become short. Specifically, the data link activation condition is set to be disadvantageous to the player. The data link effect is also set to be disadvantageous to the player.

When the amount charged to the player is large (i.e., when the player has paid a large amount of cash or virtual money), the data link start distance LS and the data link disconnection distance LE become long. Specifically, the data link activation condition is set to be advantageous to the player. The data link effect is also set to be advantageous to the player.

According to this configuration, since the data link activation condition and the data link effect change corresponding to the amount charged to the player, it is possible to give preferential treatment to the player corresponding to the amount charged to the player (e.g., the purchase of a radar charge item, the total amount charged, the total charge count, the cumulative amount charged during the last period, or the charge count during the last period).

Figure 15:
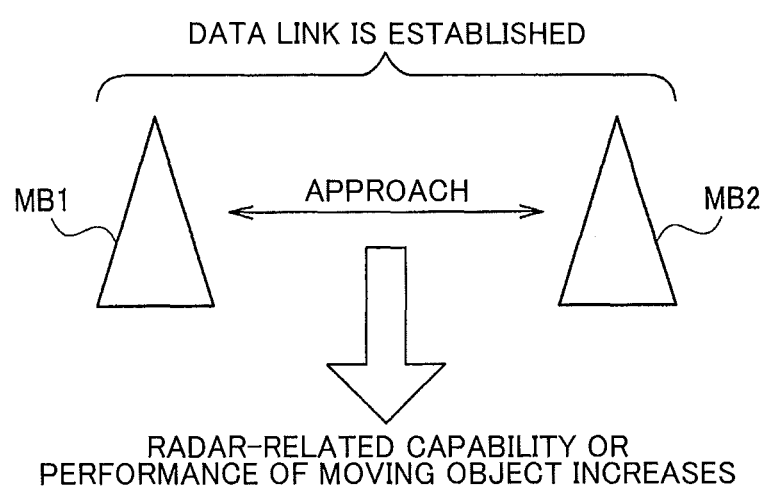
FIG. 15 is a view illustrating a method that increases a radar-related capability or the like corresponding to the distance between player fighter aircraft and friend fighter aircraft.

As illustrated in FIG. 15, a process may be performed that increases the radar-related capability or the performance (data link effect) corresponding to the distance between the player fighter aircraft MB1 and the friend fighter aircraft MB2. Such a process is not performed during a data link in the real world. However, it is possible to prompt the player to battle while operating the player fighter aircraft to be situated closer to the friend fighter aircraft by performing such a process during the game.

3. Detailed Processing Example

A detailed processing example according to one embodiment of the invention is described below using flowcharts illustrated in FIGS. 16 and 17.

Figure 16:
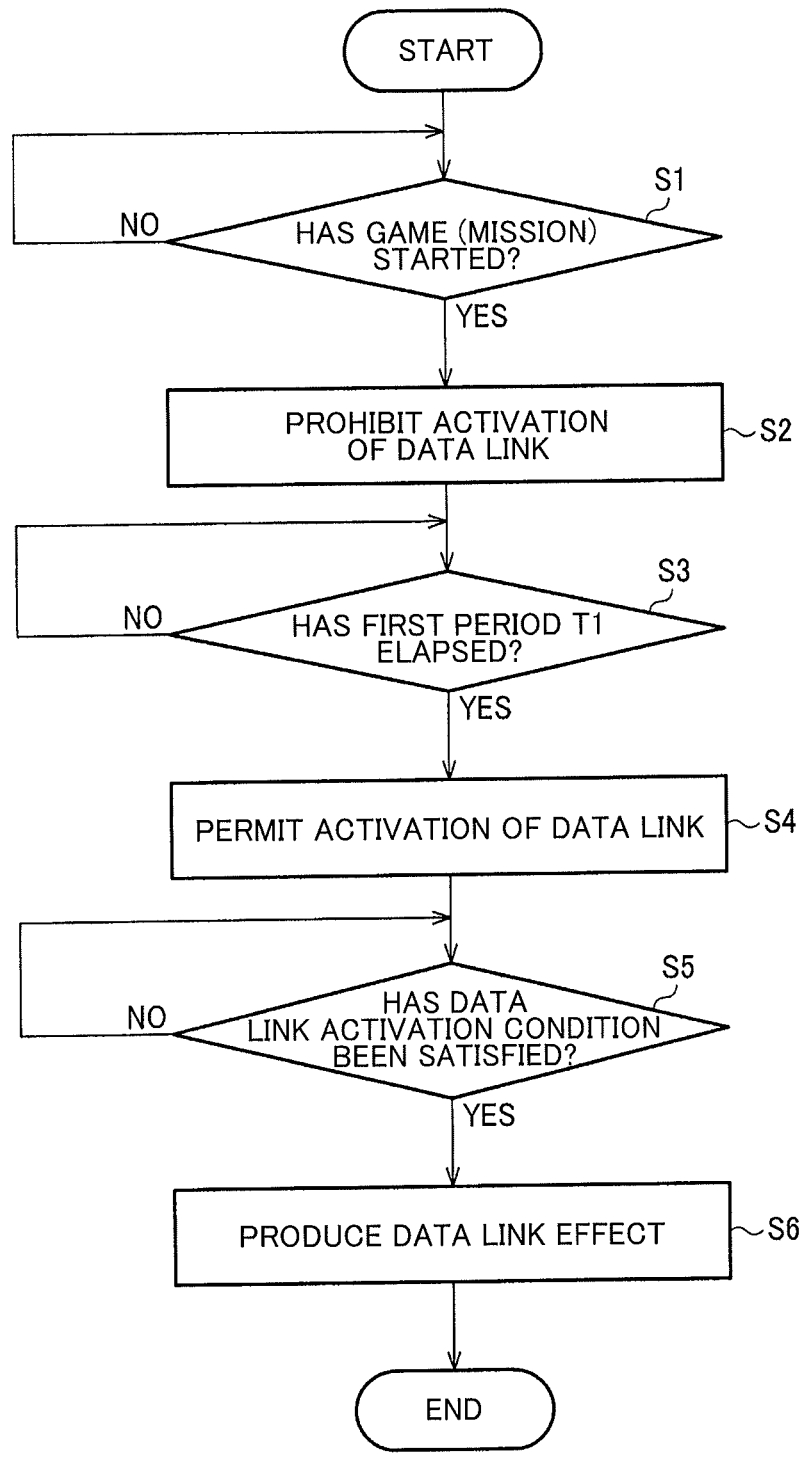
FIG. 16 is a flowchart illustrating a detailed processing example according to one embodiment of the invention.

As illustrated in FIG. 16, whether or not the game (mission) has started is determined (step S1). When it has been determined that the game has started, activation of the data link (production of the data link effect) is prohibited (see FIG. 8) (step S2). Whether or not the first period T1 has elapsed is determined (step S3). When it has been determined that the first period T1 has elapsed, activation of the data link is permitted (step S4).

Whether or not the data link activation condition has been satisfied is determined (step S5). Specifically, the data link activation condition determination process described above with reference to FIGS. 6A and 6B is performed. When it has been determined that the data link activation condition has been satisfied, the process that produces the data link effect is permitted (step S6). Specifically, the process that produces the data link effect described above with reference to FIG. 12 and the like is performed.

Figure 17:
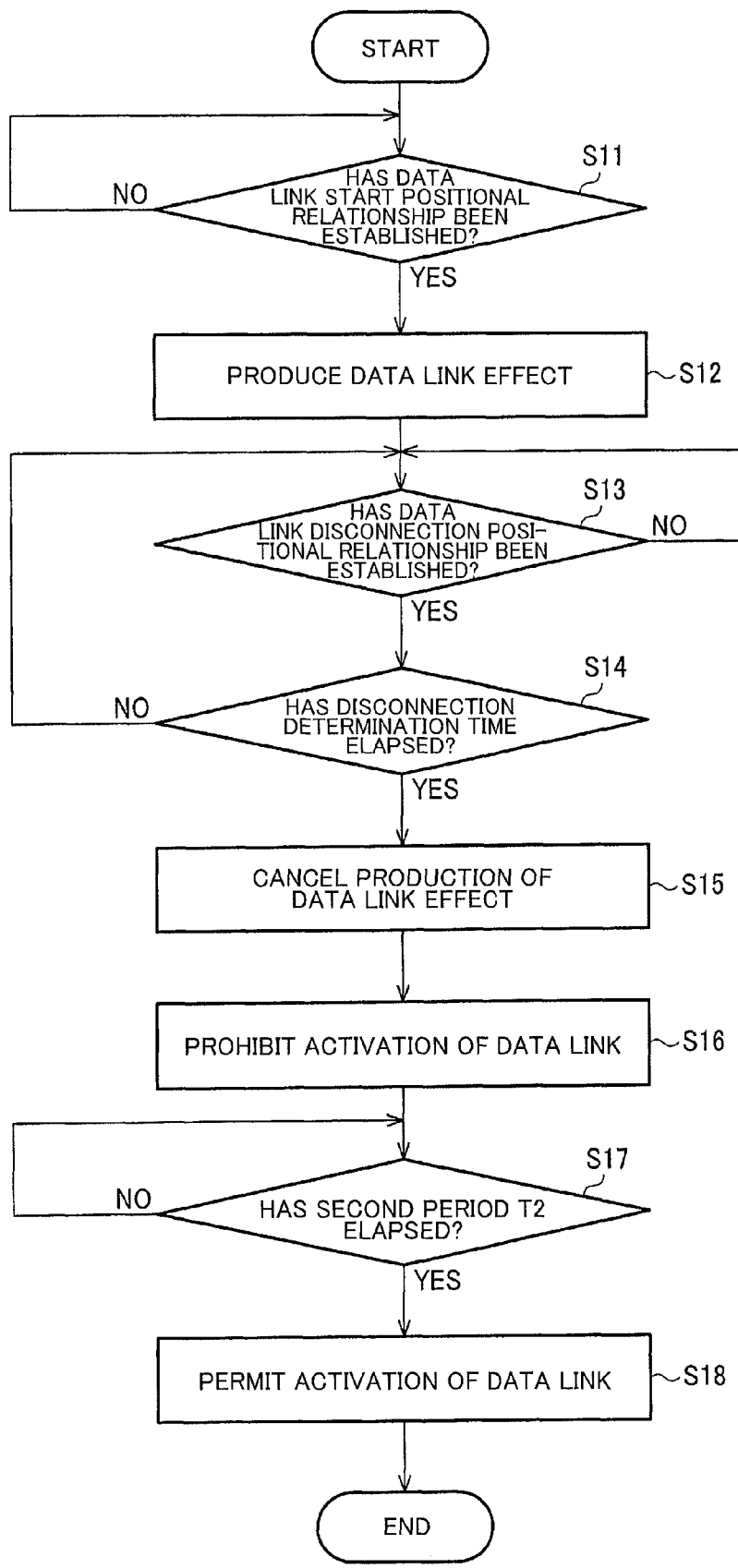
FIG. 17 is a flowchart illustrating a detailed processing example according to one embodiment of the invention.

FIG. 17 is a flowchart illustrating a detailed example of activation of the data link and production of the data link effect. Whether or not the data link start positional relationship has been established is determined (step S11). When it has been determined that the data link start positional relationship has been established, the process that produces the data link effect is performed (step S12).

Whether or not the data link disconnection positional relationship has been established is determined (step S13). When it has been determined that the data link disconnection positional relationship has been established, whether or not the disconnection determination time has elapsed is determined (step S14). When it has been determined that the disconnection determination time has elapsed, the process that cancels production of the data link effect is performed (step S15). Activation of the data link (production of the data link effect) is then prohibited (step S16). Specifically, production of the data link effect during the second period T2 illustrated in FIG. 8 is prohibited.

Whether or not the second period T2 has elapsed is determined (step S17). When it has been determined that the second period T2 has elapsed, activation of the data link (production of the data link effect) is permitted (step S18).

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of this invention. Any term (e.g., player fighter aircraft or friend fighter aircraft) cited with a different term (e.g., moving object or another moving object) having a broader meaning or the same meaning at least once in the specification and the drawings can be replaced by the different term in any place in the specification and the drawings. The data link activation condition determination process, the data link disconnection condition determination process, the data link effect production process, the process that sets the first period and the second period, the data link display process, and the like are not limited to those described in connection with the above embodiments. Methods equivalent to the above methods are also included within the scope of the invention.

What is claimed is:

1. A game system that implements a real world-like data link within a game space, the game system comprising:
   a communication interface comprising hardware that implements a communication process between a plurality of player terminals; and
   a hardware processor configured to implement:
      a game process that performs a process that implements a game that utilizes a moving object that moves in the game space;
      a determining process that determines a positional relationship between the moving object and another moving object based on positional information obtained by the communication process; and
      a data link process that:
         determines that a data link activation condition has been satisfied when the determined positional relationship between the two objects is a data link start positional relationship, and
         when the data link activation condition has been satisfied:
            performs a process that produces a data link effect, the process that produces the data link effect being a process that changes at least one of a radar-related capability of the moving object and performance of the moving object, and
            performs a display process that notifies a player of information about a data link established by satisfaction of the data link activation condition, wherein the processor implements the data link process such that production of the data link effect is prohibited during at least one of a given first period after the game has started, and a given second period after production of the data link effect has been canceled.

2. The game system as defined in claim 1, the data link process includes changing a data link start positional relationship determination parameter based on at least one piece of information among player status information, game status information, player input information, and player charge information about a player who operates the moving object or another player who operates the other moving object.

3. The game system as defined in claim 1, wherein the data link process includes performing a process that cancels production of the data link effect when a data link disconnection positional relationship has been established between the moving object and the other moving object, and a state in which the data link disconnection positional relationship is established has continued for a given disconnection determination time.

4. The game system as defined in claim 3, wherein the data link process includes setting at least one of a data link disconnection positional relationship determination parameter and the disconnection determination time based on at least one piece of information among player status information, game status information, player input information, and player charge information about a player who operates the moving object or another player who operates the other moving object.

5. The game system as defined in claim 1, wherein the game process includes performing a process that causes the moving object and the other moving object to depart from an identical position when the game has started.

6. The game system as defined in claim 1, wherein the display process includes performing at least one of a display process that notifies the player whether or not the data link is established between the moving object and the other moving object, a display process that notifies the player of a data link status, and a display process that notifies the player of details of the data link effect.

7. The game system as defined in claim 1, wherein the display process includes performing a display process that connects the moving object and the other moving object using a first line when the data link is established between the moving object and the other moving object, and performing a display process that connects the moving object and the other moving object using a second line that differs in pattern from the first line when the data link is not established between the moving object and the other moving object.

8. The game system as defined in claim 1, wherein the display process includes performing a display process that causes a display state when the data link is established between the moving object and the other moving object to differ from a display state when production of the data link effect is prohibited during the given first period or the given second period.

9. The game system as defined in claim 1, wherein the data link process includes performing at least one of a process that changes radar performance, a process that changes lock-on performance, and a process that changes a capability of a weapon that utilizes radar, as the process that changes the radar-related capability of the moving object.

10. The game system as defined in claim 1, wherein the data link process includes setting at least one of the data link activation condition and the data link effect based on at least one piece of information among player status information, game status information, player input information, and player charge information about a player who operates the moving object or another player who operates the other moving object.

11. A game system that implements a real world-like data link within a game space, the game system comprising:
a communication interface comprising hardware that implements a communication process between a plurality of player terminals; and
a hardware processor configured to implement:
a game process that performs a process that implements a game that utilizes a moving object that moves in the game space;
a determining process that determines a positional relationship between the moving object and another moving object based on positional information obtained by the communication process; and
a data link process that:
determines that a data link activation condition has been satisfied when the determined positional relationship between the two objects is a data link start positional relationship, and
when the data link activation condition has been satisfied:
performs a process that produces a data link effect, the process that produces the data link effect being a process that changes at least one of a radar-related capability of the moving object and performance of the moving object, and
a display process that notifies a player of information about a data link established by satisfaction of the data link activation condition, wherein the processor implements the data link process that performs a process that changes at least one of the data link activation condition and the data link effect based on at least one piece of information among player status information, game status information, player input information, and player charge information about a player who operates the moving object or another player who operates the other moving object, thereby utilizing at least one of the data link activation condition and the data link effect as an element for handicapping the player or the other player.

12. A server system that implements a real world-like data link within a game space, the server system comprising:
a network communication interface comprising hardware that implements a network communication process between a plurality of player terminals over a network; and
a hardware processor configured to implement:
a game process that performs a process that implements a networked game that utilizes a moving object that moves in the game space;
a determining process that determines a positional relationship between the moving object and another moving object based on positional information information obtained, over the network, by the network communication process; and
a data link process that:
determines that a data link activation condition has been satisfied when the determined positional relationship between the two objects is a data link start positional relationship, and
when the data link activation condition has been satisfied:
performs a process that produces a data link effect, the process that produces the data link effect being a process that changes at least one of a radar-related capability of the moving object and performance of the moving object, and
performs a display process that notifies a player of information about a data link established by satisfaction of the data link activation condition, wherein the processor implements the data link process such that production of the data link effect is prohibited during at least one of a given first period after the game has started, and a given second period after production of the data link effect has been canceled.

13. A computer-implemented processing method for a game system that implements a real world-like data link within a game space, the method comprising:
performing, by a hardware processor, a process that implements a game that utilizes a moving object that moves in the game space;

performing, by the hardware processor, a determining process that determines a positional relationship between the moving object and another moving object based on positional information obtained by the communication process; and performing, by the hardware processor, a data link process that:

determines that a data link activation condition has been satisfied when the determined positional relationship between the two objects is a data link start positional relationship, and when the data link activation condition has been satisfied:

changes at least one of a radar-related capability of the moving object and performance of the moving object, and performs a display process that notifies a player of information about a data link established by satisfaction of the data link activation condition, wherein the processor implements the data link process such that satisfaction of the data link activation condition is prohibited during at least one of a given first period after the game has started, and a given second period after production of the data link effect has been canceled.

14. A non-transitory computer-readable information storage medium storing a program that causes a computer to execute the processing method as defined in claim 13.

15. The game system as defined in claim 11, wherein the changing of the at least one of the data link activation condition and the data link effect is based on at least one piece of information among a game level of the player, a rank of the player, a total play time of the player, a cumulative play time in a last time period of the player, a total play count of the player, a play frequency in the last time period of the player, an experience value of the player, an attack capability of the player, a defense capability of the player, the progress of the game, information about a stage or a mission during the networked game, information about the game space during the game, information about the state around the player during the game, instruction information input by the player, a data link disconnection positional relationship, and an amount charged to the player.

16. The game system as defined in claim 11, wherein the changing of the at least one of the data link activation condition and the data link effect includes decreasing one of the guidance performance, the lock-on performance, and the Anti-stall performance, when the level of the player is above a predetermined threshold.

17. The game system as defined in claim 11, wherein the changing of the at least one of the data link activation condition and the data link effect includes increasing the data link start distance and the data link disconnection distance, when the level of the player is below a predetermined threshold.

18. The game system as defined in claim 11, wherein the changing of the at least one of the data link activation condition and the data link effect includes increasing one of the guidance performance, the lock-on performance, and the Anti-stall performance, when the level of the player is below a predetermined threshold.

* * * * *